(12) United States Patent
Edwards

(10) Patent No.: US 11,673,786 B2
(45) Date of Patent: Jun. 13, 2023

(54) CONNECTOR DEVICE

(71) Applicant: Ourip Pty Ltd, Glenelg (AU)

(72) Inventor: Simon Edwards, Seaford Rise (AU)

(73) Assignee: Ourip Pty Ltd., Glenelg (AU)

( * ) Notice: Subject to any disclaimer, the term of this patent is extended or adjusted under 35 U.S.C. 154(b) by 0 days.

(21) Appl. No.: 17/055,707

(22) PCT Filed: May 17, 2019

(86) PCT No.: PCT/AU2019/050483
§ 371 (c)(1),
(2) Date: Nov. 16, 2020

(87) PCT Pub. No.: WO2019/218030
PCT Pub. Date: Nov. 21, 2019

(65) Prior Publication Data
US 2021/0206620 A1 Jul. 8, 2021

(30) Foreign Application Priority Data
May 17, 2018 (AU) .............................. 2018901726

(51) Int. Cl.
*B67D 1/08* (2006.01)
*B65D 47/24* (2006.01)
(Continued)

(52) U.S. Cl.
CPC .......... *B67D 1/0807* (2013.01); *B65D 47/249* (2013.01); *B65D 77/068* (2013.01);
(Continued)

(58) Field of Classification Search
CPC .... B67D 3/045; B67D 1/0829; B67D 1/0807; B67D 1/0001; B67D 1/0021;
(Continued)

(56) References Cited

U.S. PATENT DOCUMENTS 3,032,226 A 5/1962 Terwilliger
4,421,146 A 12/1983 Bond et al.
(Continued)

FOREIGN PATENT DOCUMENTS

AU 202239883 B2 7/2007
BR 0206557 A2 4/2012
(Continued)

*Primary Examiner* — Vishal Pancholi
*Assistant Examiner* — Robert K Nichols, II
(74) *Attorney, Agent, or Firm* — Edwin A. Sisson, Attorney at Law, LLC; Jeffrey J. Banyas

(57) ABSTRACT

Various aspects of the invention described herein relate to a removable connector assembly, and methods of use and manufacture thereof. More particularly, certain embodiments relate to apparatus and methods to provide a connection to a spout disposed upon a container, such as upon a bag holding fluid. Embodiments of connector assemblies comprise an elongated outer housing, an inner housing, and a slider assembly for moving the outer surface of the sleeve member over the inner surface of the outer housing wall in a lengthwise motion to position the spout connector upon the spout and secure the spout connector in said position.

14 Claims, 15 Drawing Sheets

(51) Int. Cl.
  *B65D 77/06* (2006.01)
  *B67D 1/00* (2006.01)
  *B67D 1/12* (2006.01)

(52) U.S. Cl.
  CPC ......... *B67D 1/0001* (2013.01); *B67D 1/0021* (2013.01); *B67D 1/1277* (2013.01); *B67D 2001/0827* (2013.01)

(58) Field of Classification Search
  CPC .......... B67D 1/1277; B67D 2001/0827; B65D 47/249; B65D 77/068; B65D 77/067; F16L 41/16; Y10T 137/87957
  USPC ......................................... 222/107, 105, 559
  See application file for complete search history.

(56) References Cited

U.S. PATENT DOCUMENTS

| | | | |
|---|---|---|---|
| 5,205,440 A * | 4/1993 | Matsushita | B67D 1/0462 222/496 |
| 5,816,298 A | 10/1998 | Stricklin et al. | |
| 6,305,437 B1 | 10/2001 | Edwards | |
| 6,347,785 B1 | 2/2002 | Copp et al. | |
| D464,258 S | 10/2002 | Edwards | |
| 6,695,757 B2 | 2/2004 | Edwards | |
| 6,746,388 B2 | 6/2004 | Edwards | |
| 6,783,277 B2 | 8/2004 | Edwards | |
| 6,786,248 B2 | 9/2004 | Johnson | |
| 6,889,482 B2 | 5/2005 | Edwards | |
| 6,921,204 B2 | 7/2005 | Edwards | |
| 7,025,220 B2 | 4/2006 | Verespej | |
| 7,373,959 B2 | 5/2008 | Edwards | |
| 8,177,083 B2 | 5/2012 | Lamoureux et al. | |
| 8,556,124 B2 | 10/2013 | Edwards | |
| 8,631,971 B2 | 1/2014 | Edwards | |
| 8,672,184 B2 | 3/2014 | Edwards | |
| 2002/0094922 A1 | 7/2002 | Edwards | |
| 2002/0094923 A1 | 7/2002 | Edwards | |
| 2002/0110291 A1 | 8/2002 | Edwards | |
| 2003/0071237 A1 | 4/2003 | Johnson | |
| 2004/0068957 A1 | 4/2004 | Edwards | |
| 2004/0148910 A1 | 8/2004 | Edwards | |
| 2005/0199313 A1 | 9/2005 | Edwards | |
| 2005/0212291 A1 | 9/2005 | Edwards | |
| 2016/0312939 A1 | 10/2016 | Konishi | |
| 2019/0093810 A1 | 3/2019 | Wada et al. | |

FOREIGN PATENT DOCUMENTS

| | | |
|---|---|---|
| CN | 202082529 U | 12/2011 |
| WO | 01/07321 A1 | 2/2001 |
| WO | 0192107 A1 | 12/2001 |
| WO | 0192109 A1 | 12/2001 |
| WO | 03022314 A9 | 7/2003 |
| WO | 2009/156357 A1 | 12/2009 |
| WO | 2011044575 A3 | 7/2011 |
| WO | 2017/204240 A1 | 11/2017 |
| WO | 2018129578 A1 | 7/2018 |

* cited by examiner

CONNECTOR DEVICE

PRIORITIES AND CROSS REFERENCES

This Application claims priority from International Application No. PCT/AU2019/050483 filed on 17 May 2019 and Australian Application No. 2018901726 filed on 17 May 2018 the teachings of each of which are incorporated by reference herein in their entirety.

TECHNICAL FIELD

Various aspects of the invention described herein relate to a removable connector assembly, and methods of use and manufacture thereof. More particularly, certain embodiments relate to apparatus and methods to provide a connection to a spout assembly disposed upon a container, such as upon a bag holding fluid.

BACKGROUND

"Bag-In-Box" flexible liquid packaging has been used for the packaging and shipping of post-mix syrup to restaurant, pubs and clubs (and other retailers) for many years. In general, this form of packaging includes a plastic bag containing the syrup product, placed within a corrugated box that provides a protective housing to ease the transportation, distribution and storage of post-mix syrup during use.

"Bag-In-Box" packaging has enabled manufacturers of beverages, particularly cold carbonated beverages, to distribute their product more broadly and to provide a low cost product to restaurant, pubs and clubs. These venues, in turn, supply post-mix beverages as a finished product to their patrons at a higher margin than traditionally packaged beverages supplied in bottles or cans.

Historically, such low cost beverages were less tolerated in the marketplace and were viewed upon by patrons as inferior products. However, in recent years post-mix beverages, that is beverages prepared from post-mix syrup, have been gaining significant popularity. The service of post-mix beverages has been experiencing greater market acceptance as countertop post-mix makers have made a revival in the domestic setting. Consequently, a more diverse offering of post-mix syrup varieties is now on offer to venues as boutique beverage makers have been transitioning their products to a syrup based form to broaden the accessibility of their product to patrons.

Post mix beverages are prepared from the "Bag-In-Box" packaged syrup product by connecting a "Bag-In-Box" packaging outlet to an on-site assembly that dilutes, carbonates, refrigerates and transports the post-mix beverage to the venue's service area. Such assemblies typically include a carbonation unit, a refrigeration unit and a series of hoses and connectors to move the fluid between the units and then, in finished form, to the service area for dispensing; typically, from a push button "bar gun".

It will be readily apparent that the practical difficulties in cleansing or sanitizing hoses, connectors and dispensing equipment causes venues to maintain dedicated lines for individual varieties of post-mix beverages. Further, dispensing equipment such as "bar guns" are typically limited to a fixed number of dispensing outlets. Venues are therefore limited to a set number of beverage types that can be dispensed through a single "bar gun". Consequently, many venues cannot offer patrons the variety of post-mix beverages that are available in the marketplace, and frequently smaller boutique beverage producers miss the opportunity to supply post-mix variations of their beverage products.

Restaurants, bars and clubs may nonetheless seek to switch post-mix beverage varieties to accommodate changes in patron preferences arising, for instance, from seasonal changes, demographic changes or changes in market offerings. However, the custom configuration of "Bag-In-Box" spouts or their connectors may pose a further impediment to these venues switching beverage varieties.

On most "Bag-In-Box" packaging a spout is attached to the bag, and traditionally, a threaded adaptor is affixed to the spout which is, in turn, the connector for connecting the on-site post-mix assembly. While different connector configurations may be used by different producers of post-mix syrup, many connectors are typically one of two types; a threaded connector that engages with a corresponding thread on the spout, or a snap on connector which can be aligned to the spout and locked into the spout in some other fashion.

Several mechanical issues arise from the use of each of these connectors, many of which are interrelated, and lead to operational difficulties for the user. First, users frequently experience difficulty engaging a threaded attachment on the liquid container packaging. For both mating ends of the threaded connector to engage, the mating ends must align and the mating ends must catch one another and turn against one another to engage successfully. A challenge to either or both of these events frequently arises when the threaded arrangement on the packaging, or either mating end, becomes damaged, soiled, twisted or becomes weakened.

Should the challenges in mating a threaded attachment nonetheless be surmounted, to establish secure or sealed engagement of a threaded connector, the force required to screw a connector onto an adaptor may still be relatively high. This may result in substantial force being needed to be exerted on the spout or on the soft packaging upon which the spout is mounted. This issue also arises in the use of snap on connectors, which must align with and be placed within the spout opening if successful engagement is to take place when the connector is "snapped" on.

If the spout is not aligned well with the surrounding corrugated box packaging, the spout will simply sink into the soft, flexible bag necessitating the user to hold the spout in place somehow or maneuver the spout upon a wall of the box packaging. However, the force and handling increase the risk of damage to the spout or packaging. For example, the spout may easily be torn from the package or damaged to an extent causing a leak between the spout and the package.

Frequently, too little grip area is available on the spout to withstand the force required by the user. In these scenarios, users may resort to the use of a tool in an attempt to hold and grip the spout. In turn, the unfortunate slippage of the tool may also result in damage of the spout or packaging. The tool may slip and puncture the packaging or the bulk of the bag or packaging may impede or otherwise obstruct the needed manipulation when working with the assembled equipment.

There is also a significant risk in the use of existing connectors as soil, dirt or other foreign material that may find its way on to the spout or connector may impede the secure engagement of the connector. Such foreign material may impede proper threading, damage the thread or impede alignment of snap on fittings. For instance, threads may become stripped or cross threaded whereby the distortion of the components caused by the cross threading may result in the leakage of the product.

Thus, it is evident that improved connectors are needed that are broadly configurable to "Bag-In-Box" flexible liquid packaging and their corresponding fittings, whereby connectors alleviate one or more challenges associated with "Bag-In-Box" adoption, operation or that provide ease of use.

SUMMARY OF INVENTION

In a first broad aspect, the invention relates to a connector assembly for connecting with a spout provided on a flexible fluid container, wherein the connector assembly comprises, an elongated outer housing for maintaining an inner housing substantially therein formed from a wall having an inner surface and terminating at a first lengthwise end with an outlet shoulder for maintaining an outlet portion partially within the outer housing, and terminating at a second lengthwise end with a spout engagement collar for aligning the connector assembly above the spout, an inner housing further comprising an elongated sleeve member having an outer surface and defining an internal channel for allowing the passage of fluid therethrough, the outer surface of the sleeve member facing at least a portion of the inner surface of the outer housing and configured to have minimal clearance between the surfaces, the sleeve member extending at one end with an outlet for directing the flow of fluid therethrough and at the other end with a spout connector configured to form a sealed connection with a spout on a flexible fluid container, and a slider assembly for moving the outer surface of the sleeve member over the inner surface of the outer housing wall in a lengthwise motion to position the spout connector upon the spout and secure the spout connector in said position.

In specific embodiments, the spout engagement collar may be configured to grip the spout provided on the flexible fluid container by fitting within a space formed between two or more spout threads, annular ridges and/or other protrusions on the spout.

The biasing means of certain embodiments may be adapted to prevent the flow of fluid through the internal channel defined by the sleeve member, when the connector assembly is placed in a retracted position. And it may be adapted to permit the flow of fluid through the internal channel defined by the sleeve member when the connector assembly is placed in an engaged position. In particular, the biasing means may comprise a spring actuated valve assembly.

More specifically, the slider assembly may be actuated about a fulcrum. The fulcrum may be provided by forming the outer housing such that it comprises one or more apertures formed through the wall of the outer housing and the slider assembly comprises at least one shaft positioned to occupy the space defined by the one or more apertures, wherein the shaft provides a hinge about which the movement of the sleeve member within the outer housing is actuated.

Slider assemblies configured as such may comprise one or more levers configured to hinge about the fulcrum to actuate the movement of the sleeve member within the outer housing. The one or more levers may, in turn, comprise at least one aperture formed therethrough and the at least one shaft is configured to occupy a space defined by the at least one aperture.

In more specific embodiments, the levers may each have a sleeve engagement flange, configured to hinge about at least a pair of shafts wherein the sleeve engagement flanges compress the sleeve member against the resistant pressure of the biasing means to permit the flow of fluid through the internal channel defined by the sleeve member. In this manner, use of the connection assembly concurrently affecting the connection of the spout connector to the spout and the opening of the sleeve member fluid channel ensures that air does not enter the sleeve member channel. Air pockets within the sleeve member may alter the dosing of the fluid contained in the flexible container through the connector assembly. When utilised for the preparation of post-mix syrup, the presence of air in the connector assembly may lead to unexpectedly dilute post-mix beverages being prepared for patrons.

Further embodiments of the connector assembly of the first aspect may comprise a fastener coupling to maintain the sleeve member in an engaged position when compressed against the biasing means. Fastener couplings may comprise at least one curved protrusion projecting outwardly from at least one lever and at least one catch on the outer housing for receiving the at least one curved protrusion wherein the sleeve member may be moved from a retracted position to an engaged position by actuating the one or more levers about the fulcrum to compress the biasing means until the curved protrusion is received by the catch on the outer housing to secure the fastener coupling. In some forms of the connector assembly, the catch on the outer housing may comprise an annular catch ring positioned about the outer housing wherein the at least one protrusion is fastened to the catch ring when the sleeve member is moved to an engaged position.

It will be apparent that embodiments of the first aspect may alleviate one or more of the user challenges associated with existing connectors by linear actuation of fluid connector assemblies, for instance, by using one, two or more lever operated cams or user operated sliding locks. In other forms or embodiments, connectors described herein may co-operate with a threaded adaptor of a package in a similar manner as standard or known screw connectors. It is anticipated that the embodiments may improve a user's experience by directly or indirectly affecting shortcomings of existing connector devices or their alternatives. It is understood that many of the challenges that user's currently face are interrelated such that one challenge or issue may exacerbate another. Accordingly embodiments which address one challenge or issue may, in turn, alleviate several.

Turning again to particular embodiments of the outer housing, they may be conformed to provide the substantially secure placement of the outer housing at a desired position relative to a spout. The outer housing may be positioned to make direct physical contact with the spout, or it may simply be positioned in close proximity to the spout.

A secure placement may allow some movement of the outer housing relative to the spout. It will primarily aid the user in the placement and positioning of the connector assembly whilst the user secures the assembly and executes the linear actuation of the inner housing with respect to the spout. However, certain embodiments may also comprise a means for substantially securing the outer housing with respect to the spout, during placement of the assembly. This may alleviate the need for the user to maintain a physical connection whilst fixing the assembly to the spout.

Embodiment of the connector assembly may comprise an outer housing adapted to secure to the spout using an engagement collar. The engagement collar may be adapted to secure to the spout by sliding the engagement collar onto the spout from a side of the spout.

However, the outer housing may also conform to several shapes and/or geometries for locating the connector assembly substantially in alignment with the opening and/or for securing the connector assembly with the neck of the spout.

Certain embodiments may be adapted for fittings that are provided in the form of a spout assembly, in particular, a spout assembly comprising a valve. The inner housing of such assemblies may be formed wherein, in the engaged position, the inner housing is adapted to at least partially open a valve in the spout assembly to provide a substantially continuous aperture between the spout assembly opening and the inner housing passage.

In certain embodiments of the connector assembly, in the engaged position, the inner housing may be received within the spout assembly.

Further, in certain embodiments the passage of the inner housing may also extend through the outer housing.

It is anticipated that embodiments of the connector assembly may be adapted to variances in the spout assembly structure and/or may be tolerant to damage.

The inner housing of the connector assembly may be slidably disposed within the outer housing. As such, the inner and outer housings function to provide the linear actuation of the connector assembly. Whilst some clearance is provided between the inner and outer housings, engagement of the contact between the inner housing within the outer housing is provided such that the awkward or undesirable movement of the inner housing within the outer housing during sliding actuation of the assembly, such as that which may cause jerking or catching of the inner housing during actuation, is reduced or avoided altogether. However, the clearance between the inner and outer housing must also be sufficient to avoid any unnecessary friction between the parts during actuation.

Further aspects provide for methods of manufacture of connector assemblies embodied in any one of the aforementioned forms of the first aspect. Certain methods of manufacture may involve moulding the outer housing, sleeve member, outlet, spout connector and levers from a plastic or plastic composite material and thereafter assembling these components together with other components.

Suitable materials for the construction of the inner and outer housing may be selected on the basis of the physical characteristics or qualities required from these parts for the purpose of the intended use of the connector assembly. For instance, certain materials may cause greater friction when slid against one another, others may have varying wear characteristics, others may be amenable to reuse, sanitization or sterilisation etcetera. Additives, such as lubricants and the like may be used in combination with material selection to alter these characteristics.

In particular, the material selected may alter the force required to actuate the connector assembly. However, other components may also be incorporated within the assembly to vary the actuation of the connector to adapt it for a particular purpose. A mechanism for the actuation of the inner housing may comprise a spring or similar resistive element. A spring may be provided within the inner housing in order to provide resistive pressure to create a seal between the connector and the fitting sufficient to prevent the egress of fluid from the opening. The sealing quality may further be improved by the incorporation of an o-ring or similar mechanism.

The actuating means may also contribute to the sealing quality of the connector assembly with the spout. The actuating means may secure the actuator assembly to the inner housing, the outer housing, or the connector.

In certain embodiments, the actuator assembly includes a cam, and the cam engages with a cam surface of the inner housing. The actuating means may be provided as a hook and catch wherein either of the hook or catch is located on the cam and the other is located on an exterior surface of the inner housing.

Other embodiments may comprise alternative actuator assemblies and actuating means. For instance, the actuator assembly may include one, two or more lugs secured to the inner housing which may pass through guide grooves provided through the inner housing. Such embodiments may be user actuated, wherein the user may apply sufficient pressure to the lugs to actuate the inner housing by sliding the lugs through one or more guide grooves. The guide grooves may terminate in an actuating means provided as a twist lock mechanism, wherein the lugs may be guided by the guide grooves to hook within a loop provided at the terminus of the guide grooves.

Further aspects provide for methods of connecting a connector assemblies embodied in any one of the aforementioned forms of the first aspect. Preferred methods may comprise the steps of, placing the spout engagement collar of the connector assembly around the spout to align the connector assembly with the spout, and moving the sleeve member of the connector assembly from a retracted position to an engaged position to permit the flow of fluid through the internal channel defined by the sleeve member. The additional step of placing the spout engagement collar of the connector assembly around the spout to align the connector assembly with the spout, and moving the at least a pair of levers about the about the fulcrum to compress the biasing means until the curved protrusion is received by the catch on the outer housing to secure the fastener coupling, wherein the motion of the at least a pair of levels moves the sleeve member of the connector assembly from a retracted position to an engaged position to permit the flow of fluid through the internal channel defined by the sleeve member.

While the force required to actuate the inner housing may equally be provided by the actuator assembly or the user, for certain uses, particularly in instances where significant amounts of force may be required to actuate the inner housing, level assemblies comprising fulcrum enabled components, such as cams, may be preferred. However, simple assemblies that may be actuated without cams, such as those utilising simply lug and twist lock mechanisms, may be preferred where low cost connector assemblies offer market advantages.

In certain embodiments, the connector assembly may comprise an inner housing including a hose barb, adapted to connect a hose. In further embodiments, the connector assembly may include a threaded coupling.

BRIEF DESCRIPTION OF THE FIGURES

The invention now will be described with reference to the accompanying drawings together with examples and the preferred embodiments disclosed in the detailed description. The invention may be embodied in many different forms and should not be construed as being limited to the embodiments described herein. These embodiments are provided by way of illustration only such that this disclosure will be thorough, complete and will convey the full scope and breadth of the invention.

DETAILED DESCRIPTION OF EMBODIMENTS

Several embodiments are described in detail below with reference to the figures. Exemplary embodiments are described to illustrate certain aspects and embodiments of the invention, not to limit its scope, which is defined by the claims. Those of ordinary skill in the art will recognise that a number of equivalent variations of the various features provided in the description that follows may be possible.

Figure 1:
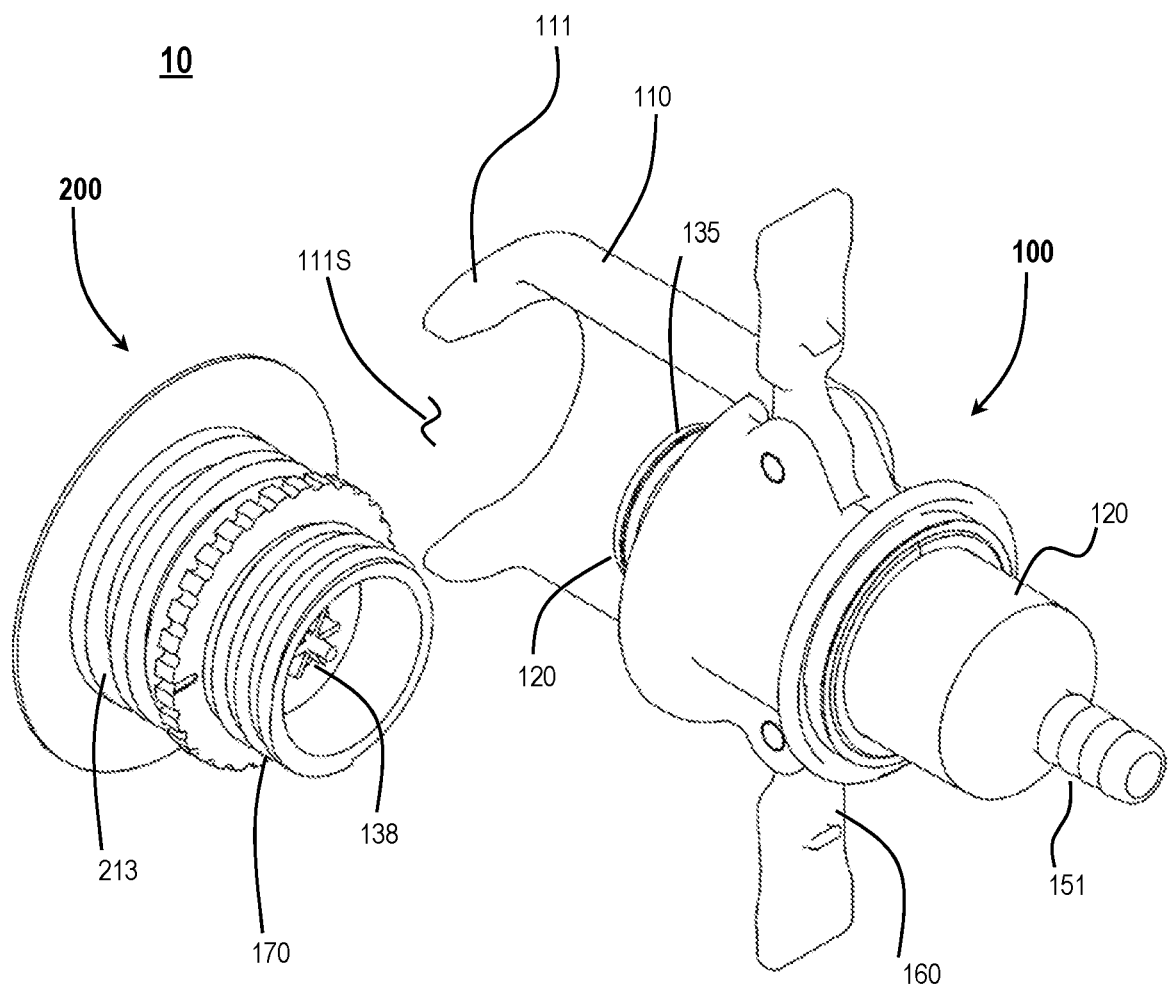
FIG. 1 provides a perspective view of a connector assembly in accordance with at least one embodiment of the invention, including connector and spout assembly.

FIG. 1 is a perspective view of a connector assembly 10, in accordance with at least one embodiment of the disclosure. The connector assembly 10 may include a connector 100 and a spout assembly 200.

The connector 100 includes an outer housing 110 and an inner housing 120. The outer housing 110 may be adapted to be secured onto the spout assembly 200. In particular, the outer housing 110 may be provided with a spout assembly engagement collar 111. The spout assembly engagement collar 111, in one embodiment, is secured to the spout assembly 200 by sliding the spout assembly engagement collar 111 in from a side of spout assembly 200, as shown in FIG. 1. The spout assembly engagement collar 111 may be secured by a retaining collar 213 on the spout assembly as described in further detail below.

The inner housing 120 may be slidably or telescopically received within the outer housing 110. The inner housing 120, in accordance with an embodiment, is provided with a passage that extends through the interior of the inner housing 120. In particular, the passage may extend along the length of the inner housing 120 so as to provide for fluid communication through the inner housing.

The connector 100 further includes a lever assembly 160. The lever assembly 160 may be in the form and constituted by a cam 160. The lever assembly 160 is provided to afford the slidable movement of the inner housing 120 within the outer housing 110. In particular, the lever assembly 160 moves the inner housing 120, relative to the outer housing 110, from a disengaged position to an engaged position with respect to its connection with the spout assembly. The disengaged position might also be characterised as a retracted position with respect to the position of the inner housing relative to the spout assembly. In the disengaged or retracted position, the inner housing 120 is not engaged with the spout assembly or the attached threaded adaptor 170. In the disengaged position, a user may slide the connector 100 onto the spout assembly 200 from a side of the spout assembly 200; from the position exemplified in FIG. 1. That is, in the retracted position, the inner housing 120 "clears" the spout assembly 200 when the connector 100 is slid onto the spout assembly 200 from the side.

Figure 19:
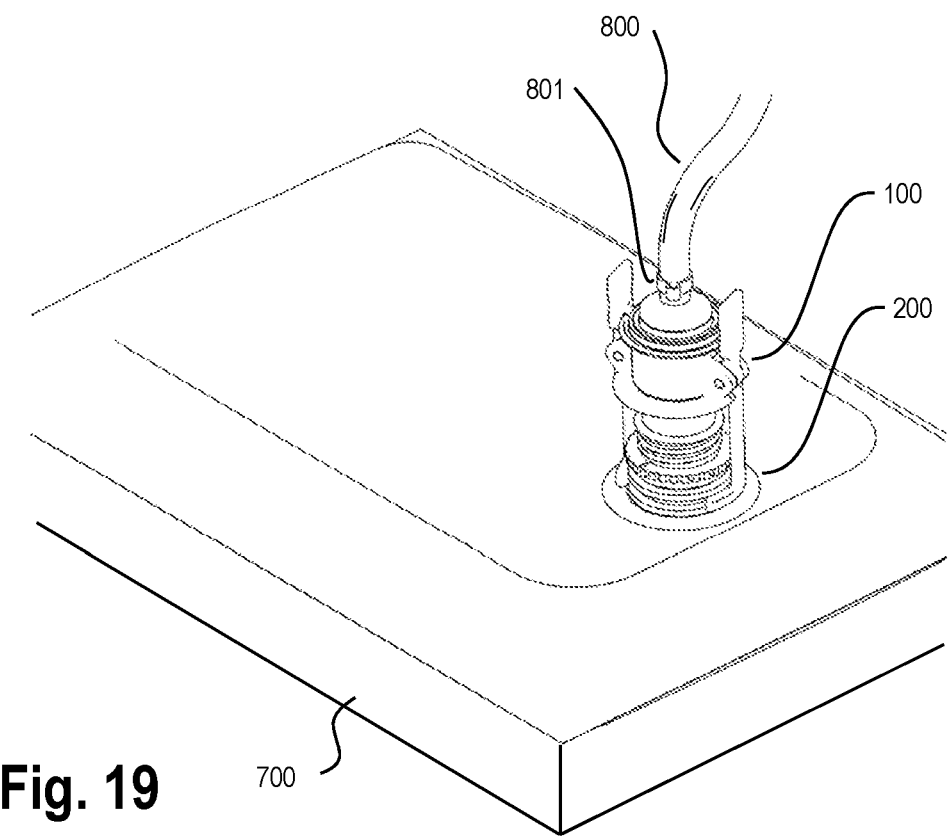
FIG. 19 provides a perspective view of a connector assembly on the package and spout assembly of FIG. 18, in accordance with at least one embodiment of the disclosure.

As described above, the lever assembly 160 moves the inner housing 120, within the outer housing 110, from a disengaged position to an engaged position. In such engaged position, the inner housing 120 is engaged with the spout assembly 200. In the engaged position, a seal 135 is provided between the inner housing 120 and the spout assembly 200. Further, in the engaged position, the inner housing is adapted to be physically positioned to open a valve 138 that is provided in the spout assembly. As a result, contained fluid communication is provided between an opening in the spout assembly and the channel that extends through the inner housing 120. Accordingly, fluid is able to pass from a container (connected to the spout assembly), through the opening in the spout assembly, through the channel within the inner housing, and may then exit the inner housing via another connector, to its final destination of use or to another destination via some other means. For instance, the inner housing may terminate with a hose barb 151, which may be connected to a suitable hose or tube to extend fluid flow to a desired destination (such a hose or tube is illustrated by connection tube 800, as shown in FIG. 19).

FIG. 1 shows an embodiment in which the inner housing 120 is disposed within and is slidable within the outer housing 110. However, it is appreciated that in some embodiments the inner housing 120 may be provided adjacent to or alongside outer housing 110, for example, or in various other configurations.

Figure 2:
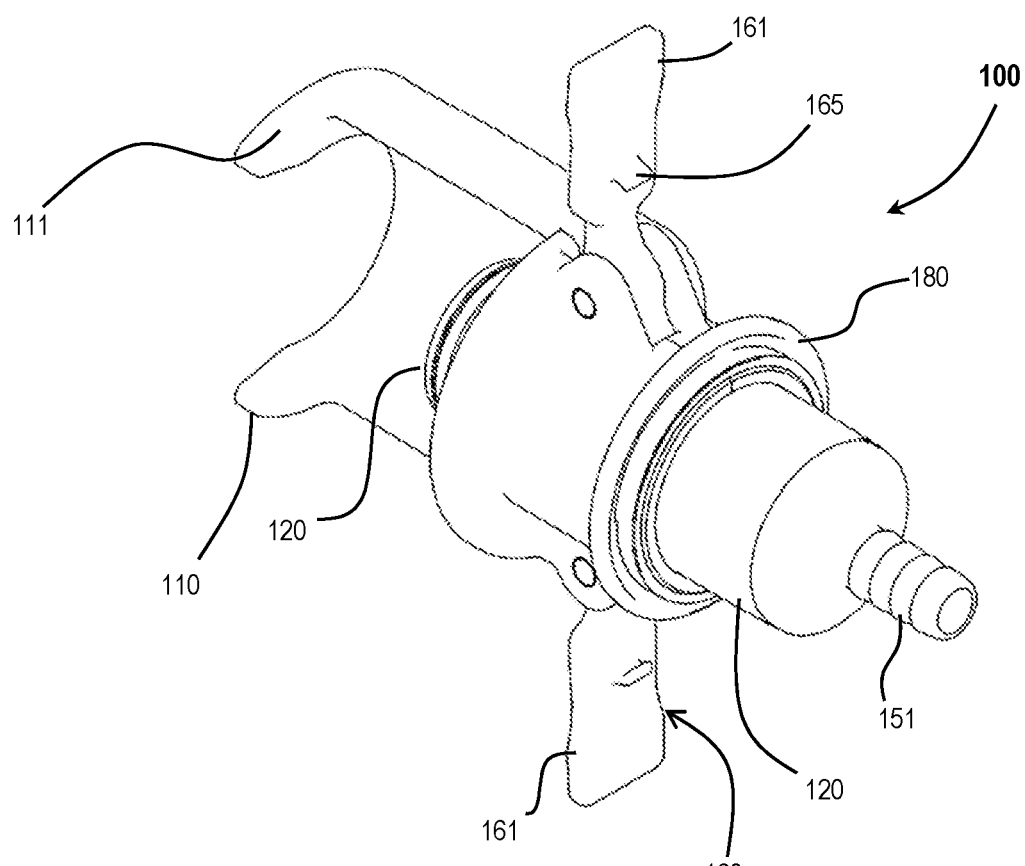
FIG. 2 provides a perspective view of the connector of FIG. 1, in accordance with at least one embodiment of the disclosure.

FIG. 2 provides a perspective view of the connector illustrated in the FIG. 1 embodiment. As shown, the connector 100 includes a lever assembly that slidably or telescopically moves through the inner housing 120, within outer housing 110. In the embodiment of FIG. 2, the lever assembly is provided in the form of a cam 160. The cam 160 includes two lever arms 161, but may include additional lever arms. A lever arm may be formed with a projecting catch 165 to maintain the arm in the engaged position by connecting with catch ring 180 formed on the outer housing 110. In the manner described below, movement of the lever arms 161 moves the inner housing 120, within the outer housing 110, from the retracted position to the engaged position.

Figure 3:
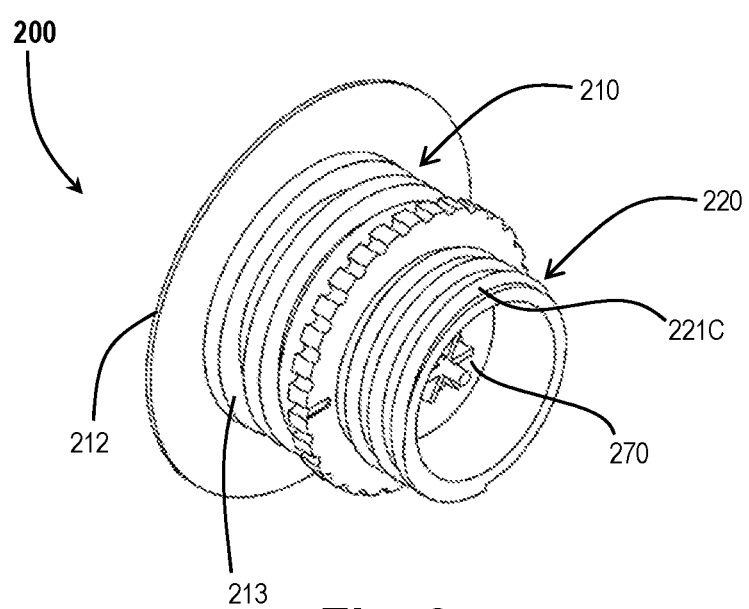
FIG. 3 provides a perspective view of the spout assembly of FIG. 1.
Figure 18:
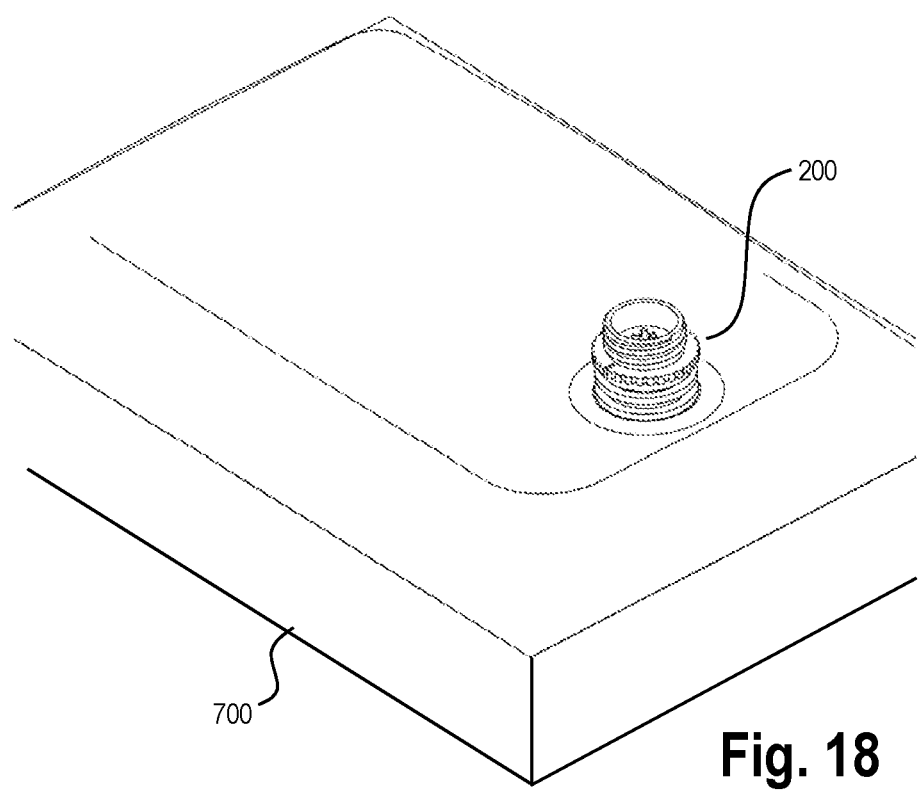
FIG. 18 provides a perspective view of a spout assembly disposed upon a package, in accordance with at least one embodiment of the disclosure.

FIG. 3 provides a perspective view of the spout assembly forming a connection with the connector illustrated in FIG. 1, in accordance with at least one embodiment of the disclosure. As shown, the spout assembly 200 includes a primary housing 210 and a secondary housing 220. The primary housing 210 may be mated to the secondary housing 220 (as described in further detail with reference to FIG. 10). As shown in FIG. 3, the primary housing 210 may be provided with a spout assembly securement collar 212. The spout assembly securement collar 212 may be configured to provide suitable alignment for the positioning of the inner housing with a spout assembly opening to engage the connector upon actuation of the level assembly. The spout assembly securement collar 212 may thus be used to secure the spout assembly 200 onto a container or package as desired (an example is further illustrated at package 700 shown in FIG. 18). Further, the secondary housing 220 may be provided with threads 221C. In some uses of the connector assembly 10, it may be desirable to connect the spout assembly 200 to an alternative connector prior to connecting with connector 100. Accordingly, the threads 221C (provided on the secondary housing 220) may provide such adaptability.

Figure 4:
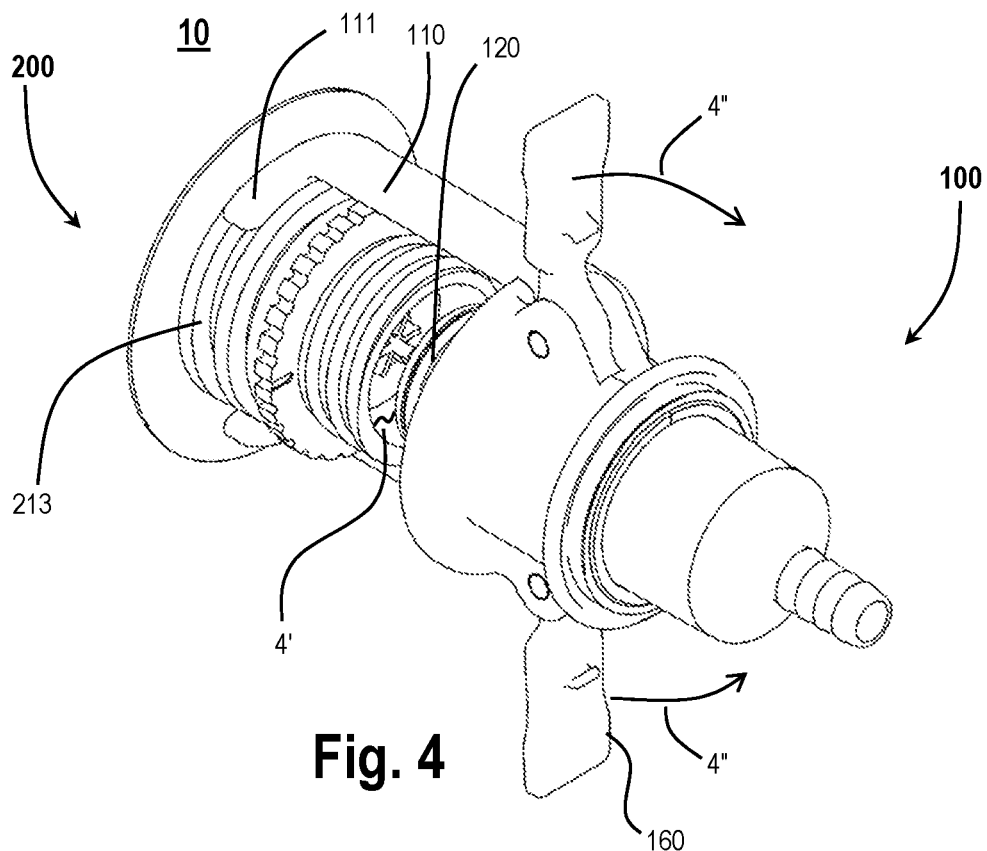
FIG. 4 provides a perspective view of a connector assembly in a first connecting position, in accordance with at least one embodiment of the disclosure.

FIG. 4 provides a perspective view of the connector assembly 10, including connector 100 and spout assembly 200 in a first connecting position, in accordance with at least one embodiment of the invention. In the arrangement shown in FIG. 1, the connector 100 is positioned upon the spout assembly 200. In particular, the spout assembly engagement collar 111 (of the connector 100) is engaged with retaining collar 213. As described above, this arrangement may be achieved by sliding the connector 100 over the spout assembly 200 via an opening in retaining collar 213. Accordingly, the outer housing 110 including the spout assembly engagement collar 111 may be characterized as being engaged with the spout assembly, as shown in FIG. 4. However, the inner housing 120 as illustrated in FIG. 4 is not yet engaged with the spout assembly 200. In particular a clearance 4', shown in FIG. 4, is provided between the inner housing 120 and an end of the spout assembly 200. It is this clearance 4' that allows the connector 100 to be slid upon the spout assembly 200 from the side, in accordance with at least one embodiment of the disclosure.

As described above, in the arrangement shown in FIG. 4, the inner housing 120 is not yet engaged with the spout assembly 200. Hand in hand with disengagement of the inner housing 120 with the spout assembly 200 is the disengagement of the cam 160.

Figure 5:
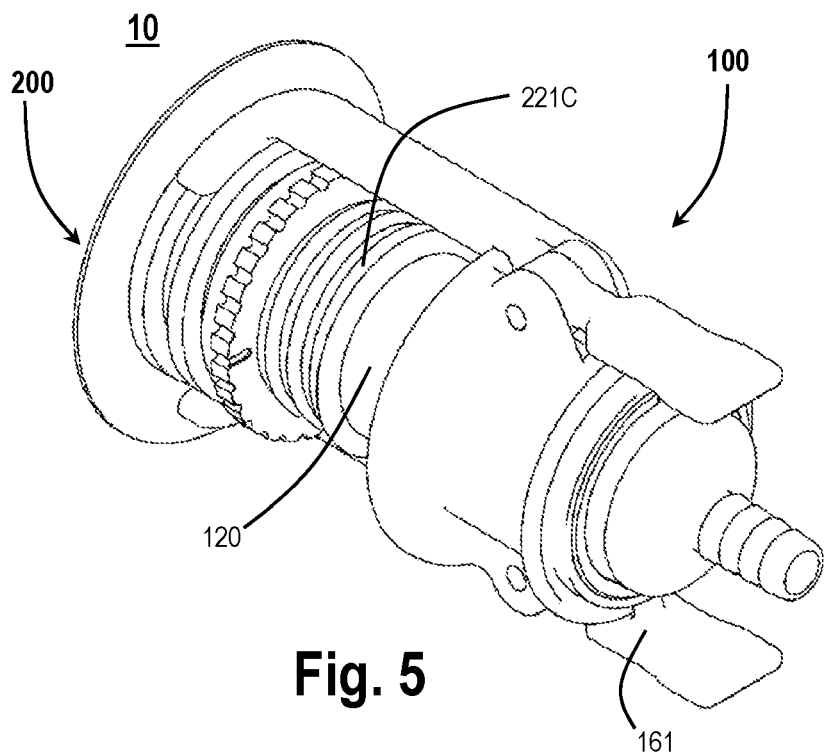
FIG. 5 provides a further perspective view of a connector assembly in a second connecting position, in accordance with at least one embodiment of the disclosure.

FIG. 5 is a further perspective view of the connector assembly 10 in a second connecting position between connector 100 and spout assembly 200. In the arrangement shown in FIG. 1, the connector 100 is positioned upon the spout assembly 200, in the manner as shown in FIG. 4. In particular, the spout assembly engagement collar 111 (of the connector 100) is engaged with retaining collar 213. As described above, this arrangement may be achieved by sliding the connector 100 from a side adjacent to the spout assembly 200 and engaging the inner housing 120 with the spout assembly 200. In particular, the inner housing 120 is inserted into the end of the spout assembly 200 and valve 138 within the spout assembly (not shown) is released to permit the passage of fluid through the spout. Movement of the inner housing 120 to engage with the spout assembly 200 is actuated by engagement of the cam 160. That is, as shown in FIG. 5, both lever arms 161 of the cam 160 are positioned so as to engage cam surfaces associated with the lever arms 161. Lever arms 161 may be locked into an engaged position by connecting catch 165 to catch ring 180 (not shown, components illustrated in FIG. 2). In connection with seal 135, the locked position may render the connection between the spout and connect water tight.

It may be appreciated with reference to FIGS. 4 and 5, that the particular orientation of the lever arms 161 may be varied in terms of the particular position that engages associated cam surfaces with respect to the particular position that does not engage associated cam surfaces. In general, it may be appreciated by skilled persons that the particular mechanism that positions cam surfaces (of the cam 160) between an engaged position and a not engaged position may be varied as desired.

Figure 6:
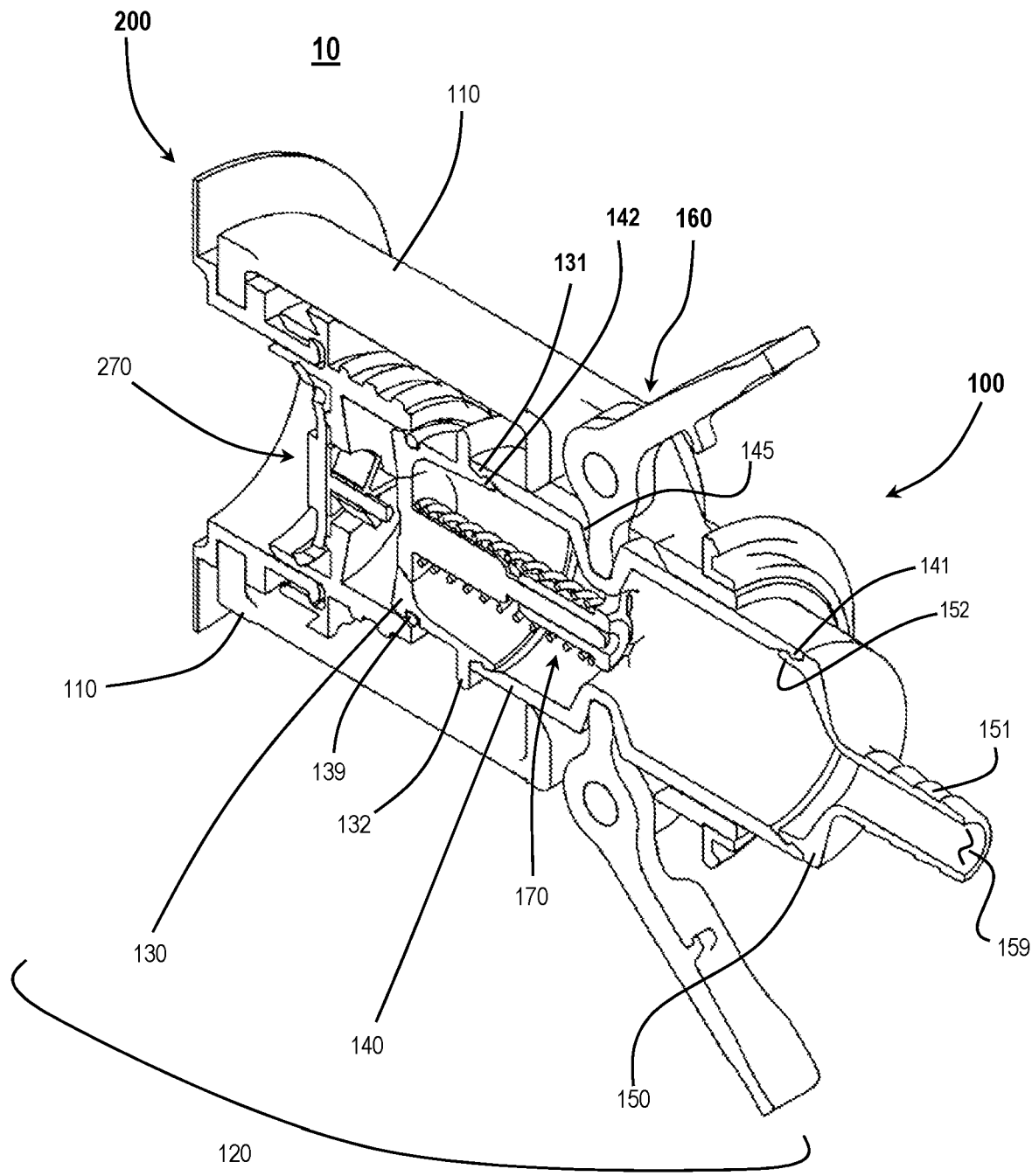
FIG. 6 provides a sectioned perspective view of a connector assembly in a first connecting position, in accordance with at least one embodiment of the disclosure.

FIG. 6 is a sectioned perspective view of the connector assembly 10, including connector 100 and spout assembly 200, in accordance with at least one embodiment of the invention. In particular, FIG. 6 shows further details of inner housing 120. As shown, the inner housing includes a tip inner housing 130, a sleeve inner housing 140, and an attachment inner housing 150. The inner housing 120 enable the flow of fluid through the channel formed in the interior thereof; that is, from a left extent as shown in FIG. 6 to a right extent as shown in FIG. 6.

The tip inner housing 130 may be in the form of an annular structure that is insertable into the spout assembly 200. The tip inner housing 130 provides for fluid passage therethrough. In particular, an exterior periphery of the tip inner housing 130 may engage with an interior periphery of the spout assembly 200, as shown. To ensure a seal between such surfaces, the tip inner housing 130 may be provided with an O-ring 139 or other sealing means. The tip inner housing 130 may be provided to accept and engage with a poppet assembly 170 (in a manner further described below). In accordance with at least one embodiment, the poppet assembly 170 may be supported by the sleeve inner housing 140 so as to extend into the tip inner housing 130.

The tip inner housing 130 and the sleeve inner housing 140 may be fitted together and be connected using a snap collar 131 on tip inner housing 130 that mates with a snap collar 142 on the sleeve inner housing 140. However, it should be appreciated that other connection mechanisms might be utilized, such as threaded arrangement, interference fit, other snap fit arrangements, barb, adhesive, or welding, for example. It will be appreciated by skilled persons that the housing portions 130, 140, 150 may indeed be integrally constructed so as to form one integral piece, in some embodiments of the apparatus of the disclosure.

As shown in FIG. 6, the tip inner housing 130 further includes a spout assembly engagement collar 132. The spout assembly engagement collar 132 is proximate to the snap collar 131. In particular, the spout assembly engagement collar 132 supports and properly seats the sleeve inner housing 140 upon the tip inner housing 130.

The inner housing 120 includes sleeve inner housing 140, in accordance with at least one embodiment of the invention. The sleeve inner housing 140 provides for fluid flow therethrough. The sleeve inner housing 140 may be in the form of an annular structure as shown. The sleeve inner housing 140 extends between the tip inner housing 130 and the attachment inner housing 150. The sleeve inner housing 140 supports poppet assembly 170. In particular, the sleeve inner housing 140 includes one or more cam surfaces 145. The cam surfaces 145 engage with the cam 160 so as to slide the inner housing 120 toward the spout assembly. As a result, the inner housing 120 is inserted into the spout assembly as otherwise described herein. The cam surface 145 may be formed as an annular recess extending around an outer periphery of the sleeve inner housing 140. In other embodiments, the cam surface 145 may be provided as separate indents or recesses provided on opposing sides of the sleeve inner housing 140. The particular shape of the cam surface 145 may be varied dependent on various factors including amount of force required to slide the inner housing 120 into the spout assembly 200, the particular mechanism driving the cam surface 145, the number of cams, the amount of travel that is desired of the inner housing 120 within the outer housing 110, or other factors.

Figure 17:
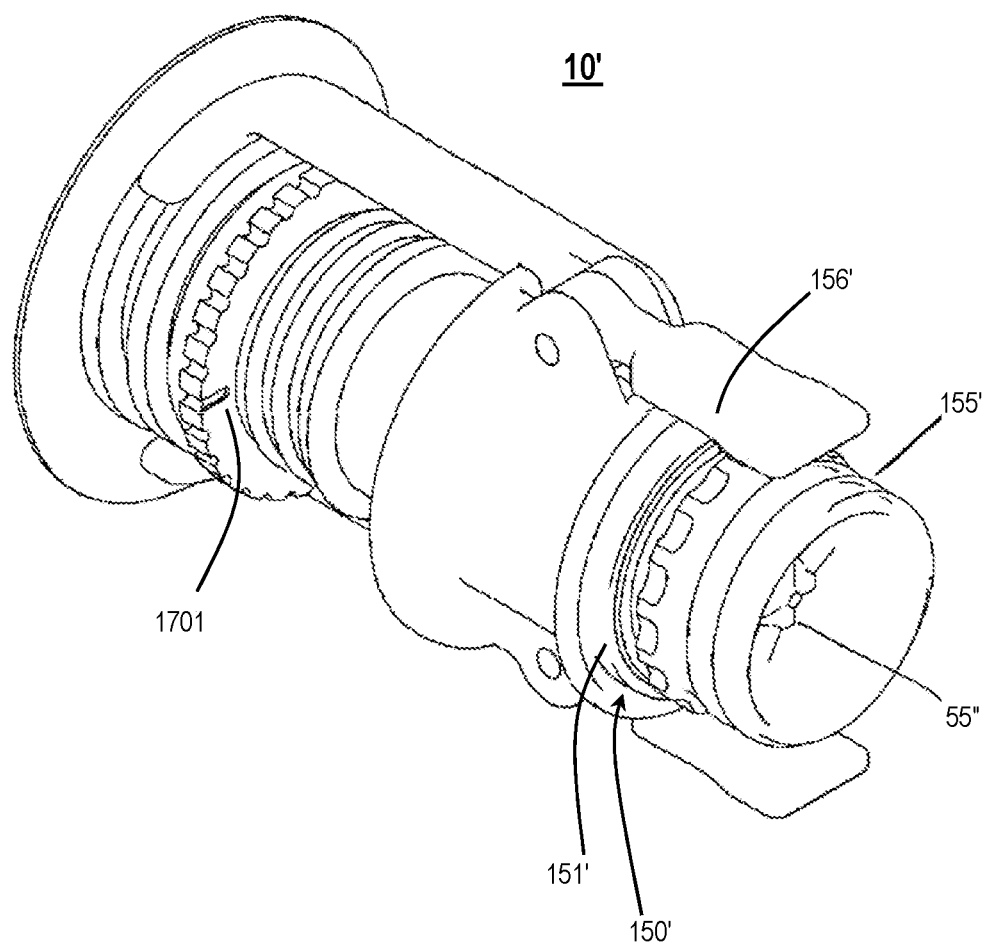
FIG. 17 provides a perspective view of a connector assembly of an alternative attachment feature designed to co-operate with a connector according to at least one embodiment of the disclosure.

As described above, the inner housing 120 further includes an attachment inner housing 150. The attachment inner housing 150 provides for fluid passage therethrough and includes opening 159. In the embodiment shown in FIG. 6, the attachment inner housing 150 may constitute an end of the inner housing 120 and be disposed at least partially outside the outer housing 110, along with a portion of the sleeve inner housing 140. The attachment inner housing 150 and the sleeve inner housing 140 may be fit together and be connected using a snap collar 152 on tip inner housing 130 that mates with a snap collar 141 on the sleeve inner housing 140. However, it should be appreciated that other connection mechanisms might be utilised, such as threaded arrangement, interference fit, other snap fit arrangements, barb, adhesive, welding, or integral construction, for example. In some embodiments, the attachment inner housing 150 may be easily snapped or popped off the sleeve inner housing 140 so as to provide interchangeability of attachment types or tip types. In the particular example of FIG. 6, the attachment inner housing 150 is provided with a hose barb 151. However, this function is not limited to such an attachment arrangement and other attachment arrangements might be utilised depending on the particular pipe, hose or other conduit or receptacle that is desired to be connected. For example, in lieu of the hose barb 151, a smooth exterior periphery might be utilised, to connect a pipe or hose for example, in conjunction with a suitable pipe clamp. FIG. 17, described below, shows an alternative attachment arrangement or engagement feature.

Figure 7:
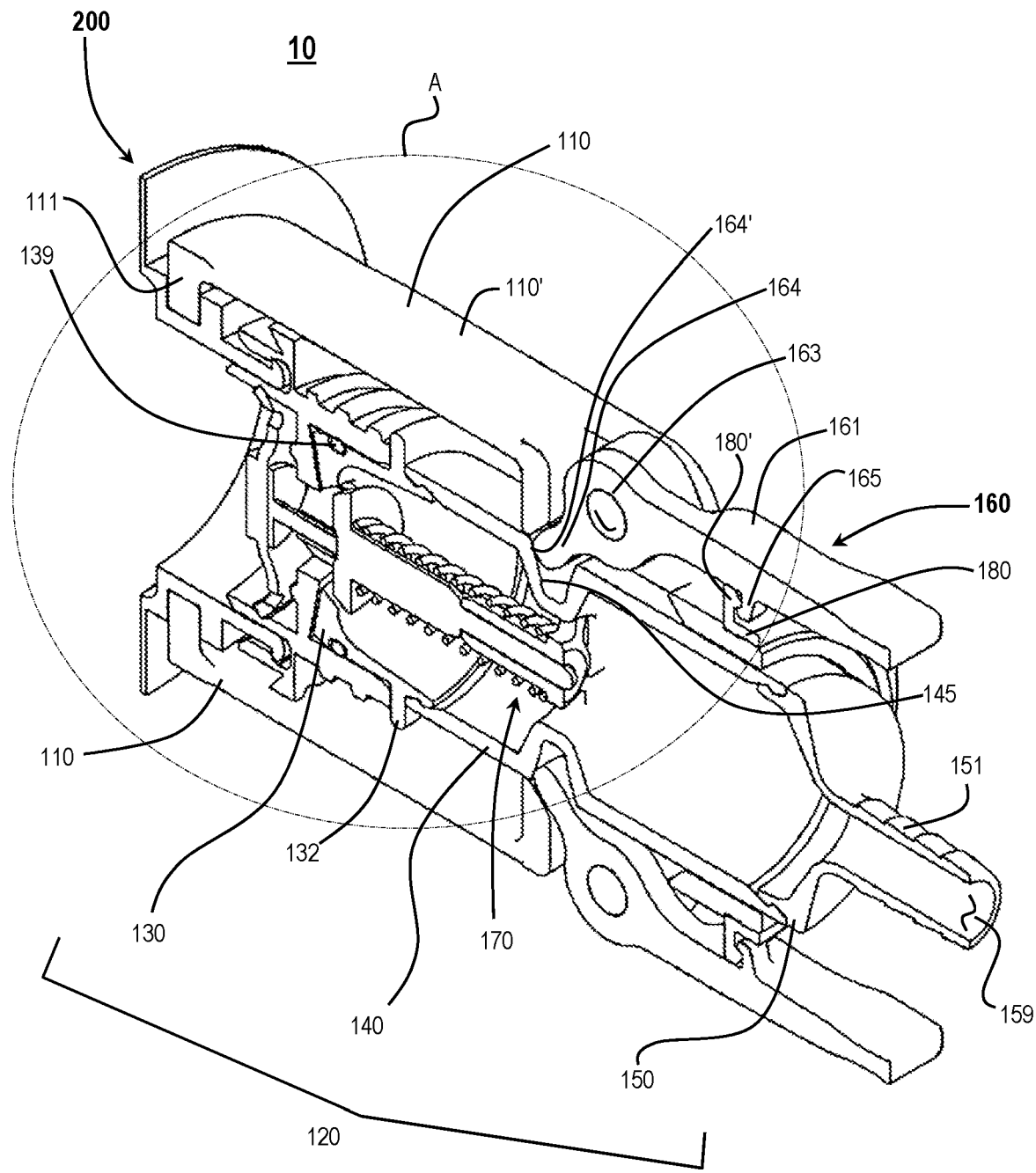
FIG. 7 provides a further sectioned perspective view of a connector assembly in a first connecting position, in accordance with at least one embodiment of the disclosure.

FIG. 7 is a further sectioned perspective view showing additional details of a connector assembly 10, in a first connecting position. In particular, FIG. 7 shows further details of the body or outer housing 110 of the connector 100, as well as further details of cam 160 in said position. As shown, the outer housing 110 may be an annular sleeve. As described above, the outer housing 110 includes one or more spout assembly engagement collars 111. The spout assembly engagement collars 111 engage with the spout assembly 200 and to support the connector 100 upon the spout assembly 200. The outer housing 110 may include a main body 110'. In manner further described below, the outer housing 110 supports cam 160.

Figure 13:
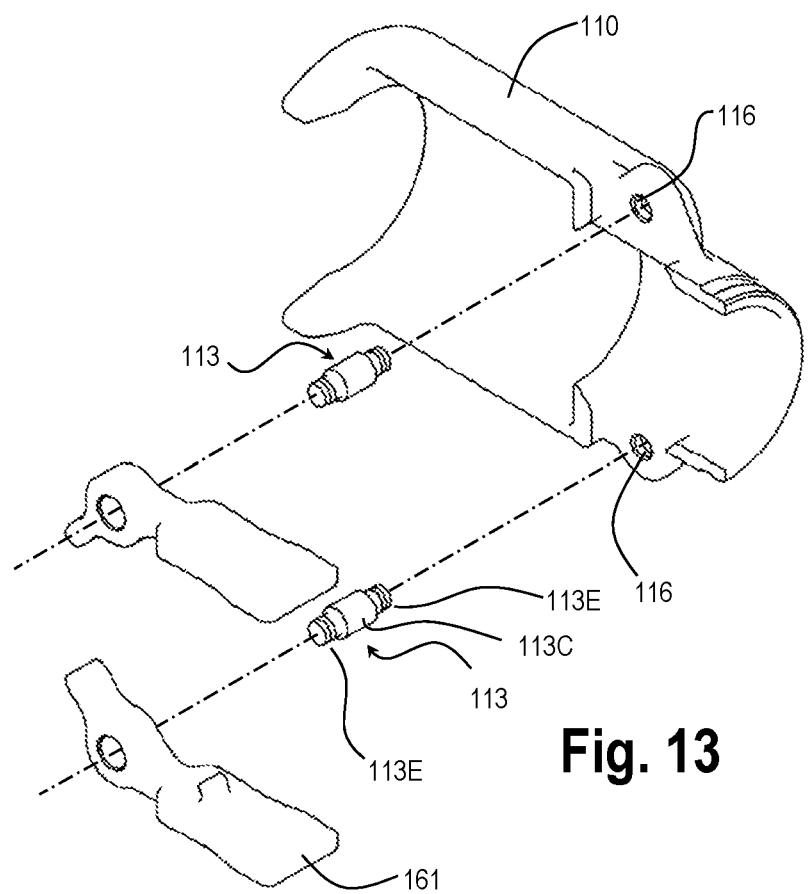
FIG. 13 provides an exploded view of an outer housing and cam in a first assembly position, in accordance with at least one embodiment of the disclosure.

The outer housing 110 may pivotally support cams 160, with two opposing cams 160 shown in FIG. 7, so as to provide movement of the inner housing 120 between a first connecting position in the arrangement shown in FIG. 4 and a second connecting position in the arrangement shown in FIG. 5. The outer housing 110 may be provided with pivot pins or axles 113 as shown in FIG. 13 (not shown in FIG. 7).

As shown in FIG. 7, cam 160 may include lever arm 161 that manipulates a cam arm 164 about a pivot hole 163. It is appreciated that the particular dimensions of the lever arm 161 and the cam arm 164, including the amount of force applied about pivot arm 163, may be varied as desired. In particular, such dimensionality may be provided based on the interrelationship to cam surface 145 of the sleeve inner housing 140.

In accordance with at least one embodiment of the invention, the lever arm 161 may be provided with a catch 165. A catch ring 180 may be disposed about the sleeve inner housing 140. As shown in FIG. 7, the catch 165 may engage with a mating catch 180' to secure the lever arm 161 in the position shown in FIG. 7. In such position, the cam arms 164, including in particular cam surface 164', is engaged with the cam surface 145 of the sleeve inner housing 140. In such engagement, the tip inner housing 130 is inserted into and held in the spout assembly 200. In the embodiment shown in FIG. 7, the catch ring 180 is a sleeve that fits upon the main body 110'. However, it is appreciated that the catch ring 180 and/or the catch 180' may be integrally formed upon the main body 110'.

FIG. 7 indicates the view identified as portion A. Various features of view portion A are described in further detail with reference to FIGS. 8 to 11 below.

Figure 8:
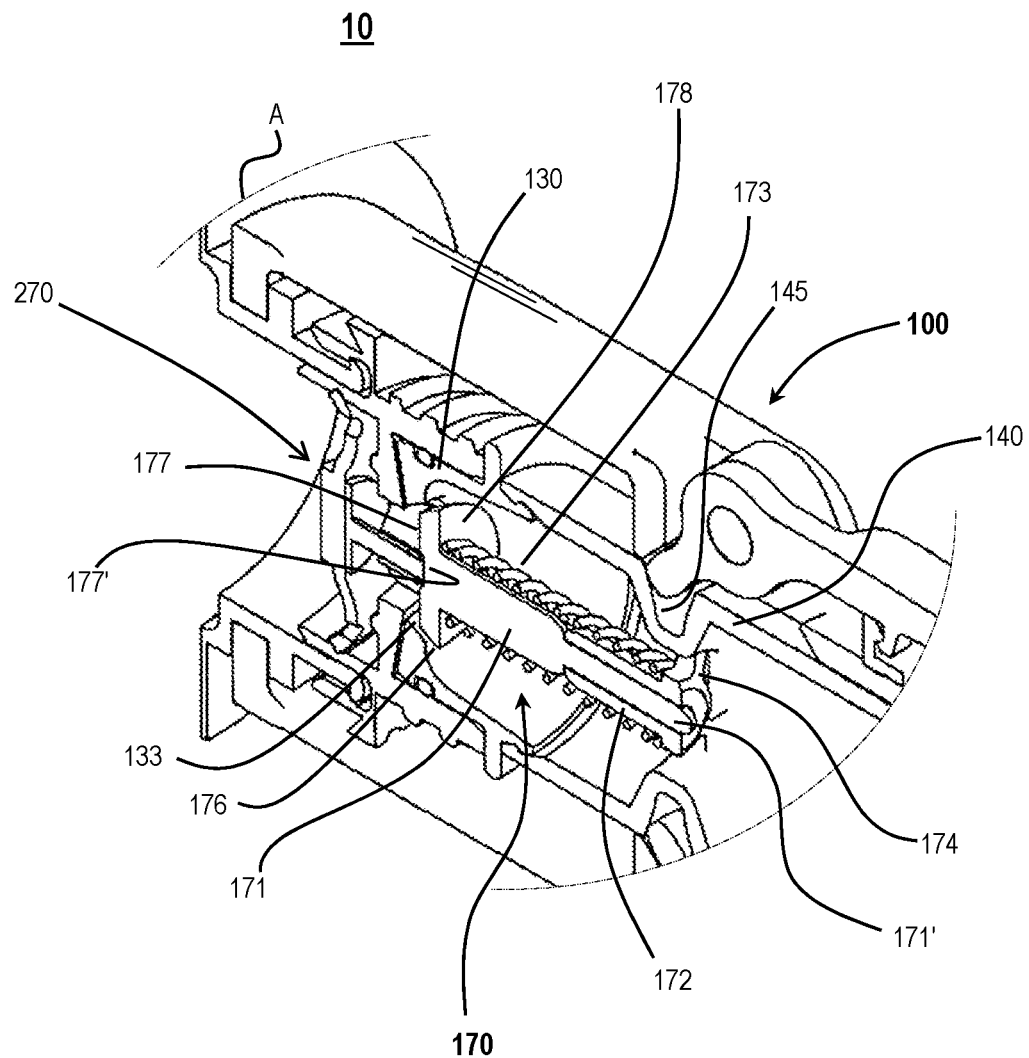
FIG. 8 provides an exploded view of portion A of the connector assembly of FIG. 7, showing further details of a poppet assembly in accordance with at least one embodiment of the disclosure.

FIG. 8 is an exploded view of portion A, of the connector assembly 10 showing further details of poppet assembly 170. As shown in FIG. 8, the poppet assembly 170 is supported by sleeve inner housing 140 and extends into tip inner housing 130. The poppet assembly 170 may include a poppet guide sleeve 172. The poppet guide sleeve 172, as shown, includes a bore that slidably houses poppet pin 171'. The poppet guide sleeve 172 may be connected to the sleeve inner housing 150 utilising suitable support fingers 174, flanges of other support structure. The support fingers 174 may be integrally formed with the poppet guide sleeve 172 or integrally formed with the sleeve inner housing 140. Such construction of the support fingers 174 or similar structure affords connection and support to the poppet guide sleeve 172, while still allowing fluid flow around the support fingers 174. In accordance with one embodiment, the support fingers 174 may be provided in proximity to the cam surface 145, such an arrangement provides a narrowed or smaller interior periphery which may be conducive to support fingers 174 or a similar structure.

Integrally formed, as shown in FIG. 8, to the poppet pin 171' is the poppet stem 171. The poppet stem 171 is, in turn, connected to a valve head 175. The valve head 175 may include or be associated with head face 177, spring contact face 178, and poppet sealing face 176. The valve head 175 includes spring contact face 178. The spring contact face 178 supports a first end of spring 173 that is disposed about the poppet pin 171' and poppet stem 171. The second end of spring 173 is supported by support fingers 174. Accordingly, spring 173 acts to bias the poppet closed, that is, to "close" the poppet assembly 170. Spring 173 thereby drives poppet stem 171 to the left as shown in FIG. 8. As a result, poppet sealing face 176 is engaged with seal face 133 (of the tip inner housing 130) to prevent fluid egress there between.

Additionally, the valve head 175 includes head face 177. The head face 177 may further include a face recess 177'. The face recess 177' may be a recess, indent, or shallow aperture cut out of the head face 177. The head face 177 or the face recess 177' may engage with valve 270, and in particular valve stem 271 as described in further detail with reference to FIG. 11.

Figure 9:
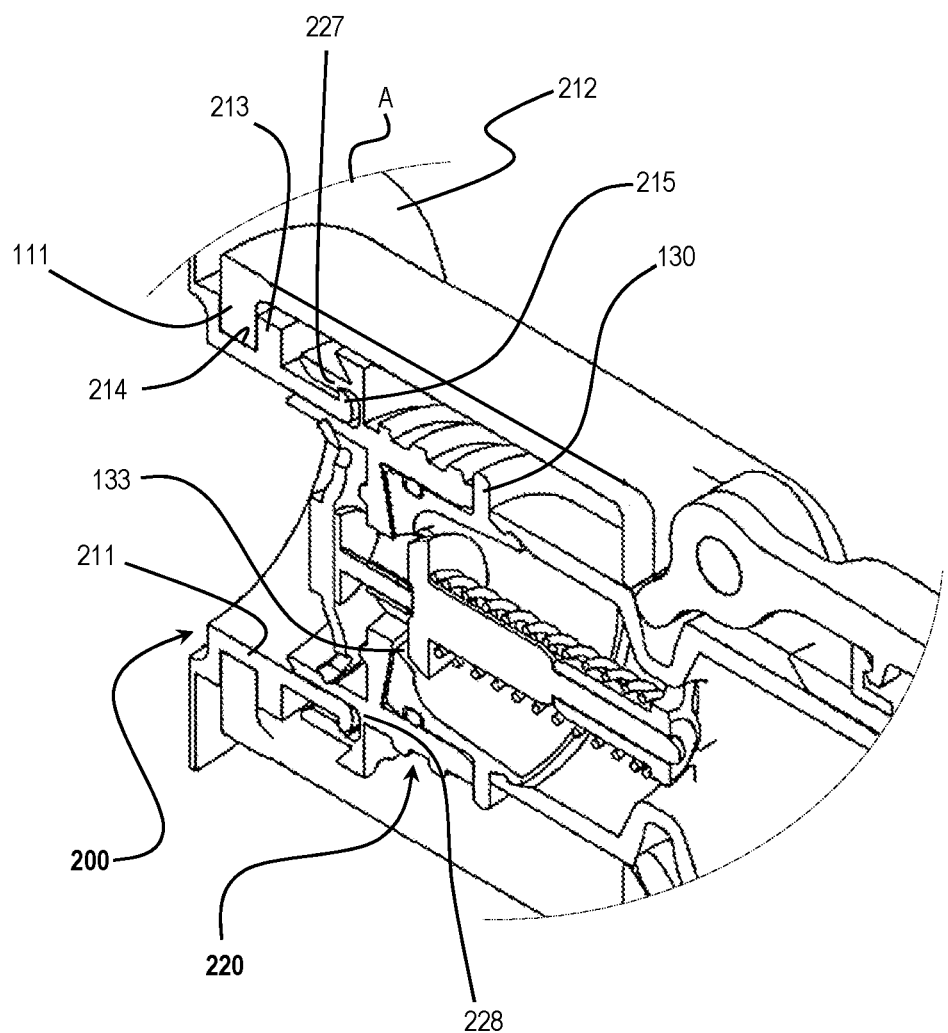
FIG. 9 provides an exploded view of portion A of the connector assembly of FIG. 7, showing further details of an adaptor of a spout assembly in accordance with at least one embodiment of the disclosure.

FIG. 9 provide an exploded view of portion A of the connector assembly 10 showing further details of spout assembly 200. As shown, spout assembly 200 includes a primary housing 210 and a secondary housing 220. The primary housing 210 may include snap collar 215 that engages with snap collar 225 of secondary housing 220. However, it should be appreciated that other connection mechanisms might be utilised, such as threaded arrangement, interference fit, other snap fit arrangements, barb, adhesive, or welding, for example, as well as integral construction of the primary housing 210 and the secondary housing 220.

The primary housing 210 includes a core sleeve 211, as shown in FIG. 9. The core sleeve 211 may be in the form of an annular pipe, tube or sleeve, for example, as may be various other components of the connector assembly 10. A spout assembly securement collar 212 may be provided at a first end of core sleeve 211 as described above. One or more retaining collars 213 may also be provided upon core sleeve 211. The one or more retaining collars 213 may define or form one or more retaining channels 214. As described above, the spout assembly engagement collar 111 may be received into retaining channel 214 so as to secure the connector 100 upon the spout assembly 200, in accordance with at least one embodiment of the disclosure.

As described above, the primary housing 210 may include snap collar 215. As shown, the core sleeve 211 may be received into an annular groove 228 provided in the secondary housing 220. Such an arrangement may securely attach and seat the primary housing 210 to the secondary housing 220.

Figure 10:
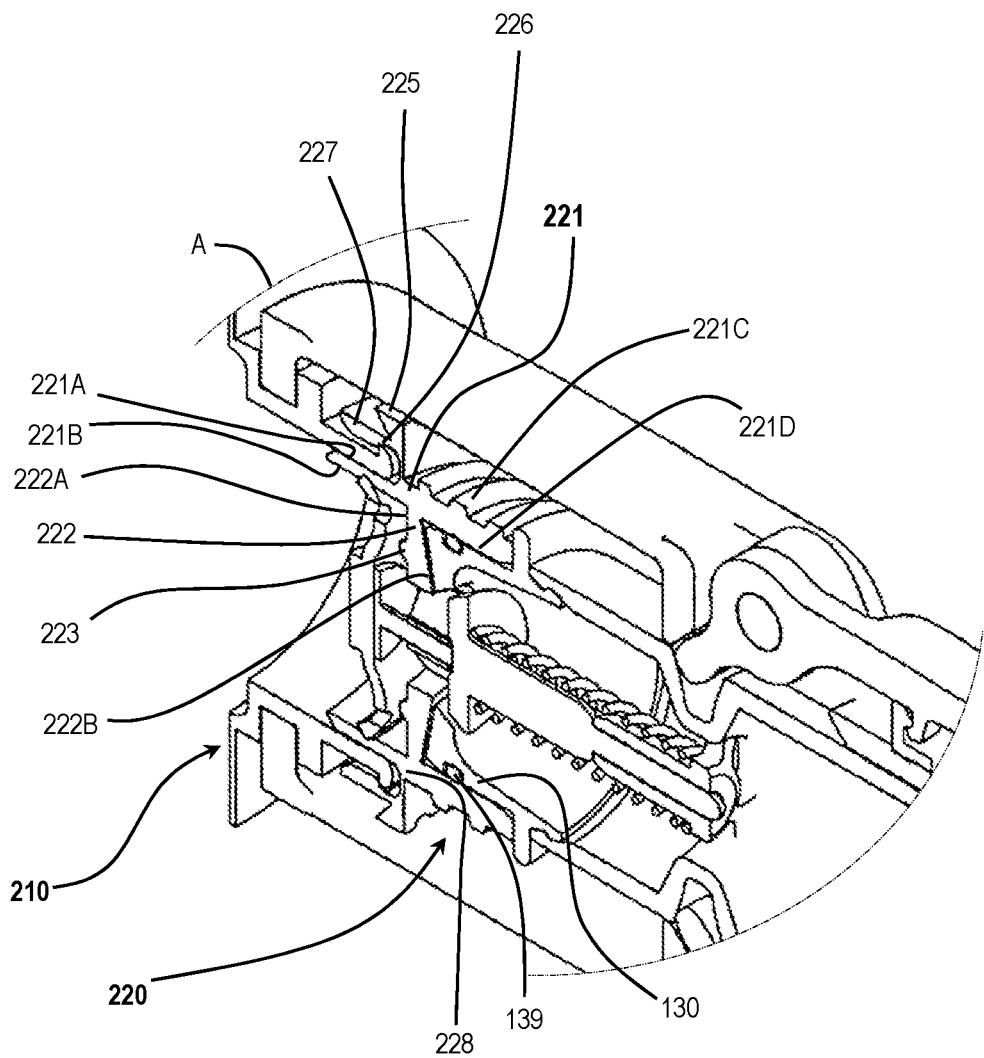
FIG. 10 provides a further exploded view of portion A of the connector assembly of FIG. 7, showing further details of a secondary housing of a spout assembly in accordance with at least one embodiment of the disclosure.

FIG. 10 is an exploded view of view portion A of the connector assembly 10 showing further details of a secondary housing of spout assembly 200. In particular FIG. 10 shows further details of the secondary housing 220.

The primary housing 210 may include sleeve 221. The sleeve 221 may be in the form of an annular pipe, tube, or sleeve, for example. As shown in FIG. 10, a connector support flange 225 may extend from an exterior periphery "EP" of the sleeve 221. The connector support flange 225 may provide further structural support to engage the outer housing 110 and to align or orient the outer housing 110 with the spout assembly 200. A secondary sleeve 227 may be attached and extend from the connector support flange 225. The secondary sleeve 227 may extend in an annular manner about the sleeve 221, and specifically about sleeve inner EP 221A. Accordingly, the secondary sleeve 227 in conjunction with the sleeve 221 (including sleeve inner EP 221A) form annular groove 228. As described above, the primary housing 210 may be received into the annular groove 228, in accordance with at least one embodiment of the disclosure.

The secondary housing 220 may further include, disposed on an interior periphery (IP) of the sleeve 221, a sleeve inner flange 222. The sleeve inner flange 222 includes a flange inner surface 222A, upon which is provided a valve sealing ridge 223. As shown, the valve sealing ridge 223 is integrally formed with the sleeve inner flange 222. The valve sealing ridge 223 provides a sealing surface to engage with valve 270. The sleeve inner flange 222 further includes a flange outer surface 222B, which engages and seats with tip inner housing 130. Accordingly, the flange outer surface 222B may provide structural support and may assist in orienting the tip inner housing 130 with respect to the secondary housing 220.

The connector support flange 225 may be characterized as separating an exterior periphery "EP" of the sleeve 221 into an inner EP portion, as well as an outer EP portion. The sleeve inner flange 222 may be characterised as separating an exterior periphery "IP" of the sleeve 221 into an inner IP portion, as well as an outer IP portion. Accordingly, this configuration demarcates a sleeve inner EP 221A, as described above. Further, the sleeve 221 includes sleeve outer EP 221C. As described above, the sleeve outer EP 221C may be provided with threads.

The sleeve 221 further includes sleeve outer IP 221D. The sleeve outer IP 221D may provide a collar or receptacle, in conjunction with the flange outer surface 222B, to receive the tip inner housing 130. In particular, the sleeve outer IP 221D engages with O-ring 139 of the tip inner housing 130.

Yet further, the sleeve 221 includes sleeve inner IP 221B. The sleeve inner IP 221B provides an annular inner surface to mate or engage with a sealing or positioning surface or arrangement of the valve 270. Accordingly, a surface or arrangement of the valve 270 may slide along sleeve inner IP 221B, in accordance with at least one embodiment of the disclosure FIG. 11 provides and exploded view of portion A, of the connector assembly 10 showing further details of valve 270, in accordance with at least one embodiment of the disclosure.

As described above, valve 270 controls the flow of fluid through the spout assembly 200. As shown in FIG. 11, the valve 270 is illustrated in an open position, whereby fluid can flow through the valve. Alternatively, the valve 270 as shown in FIG. 6, for example, is in a closed position, whereby fluid cannot flow through the valve 270.

Figure 11:
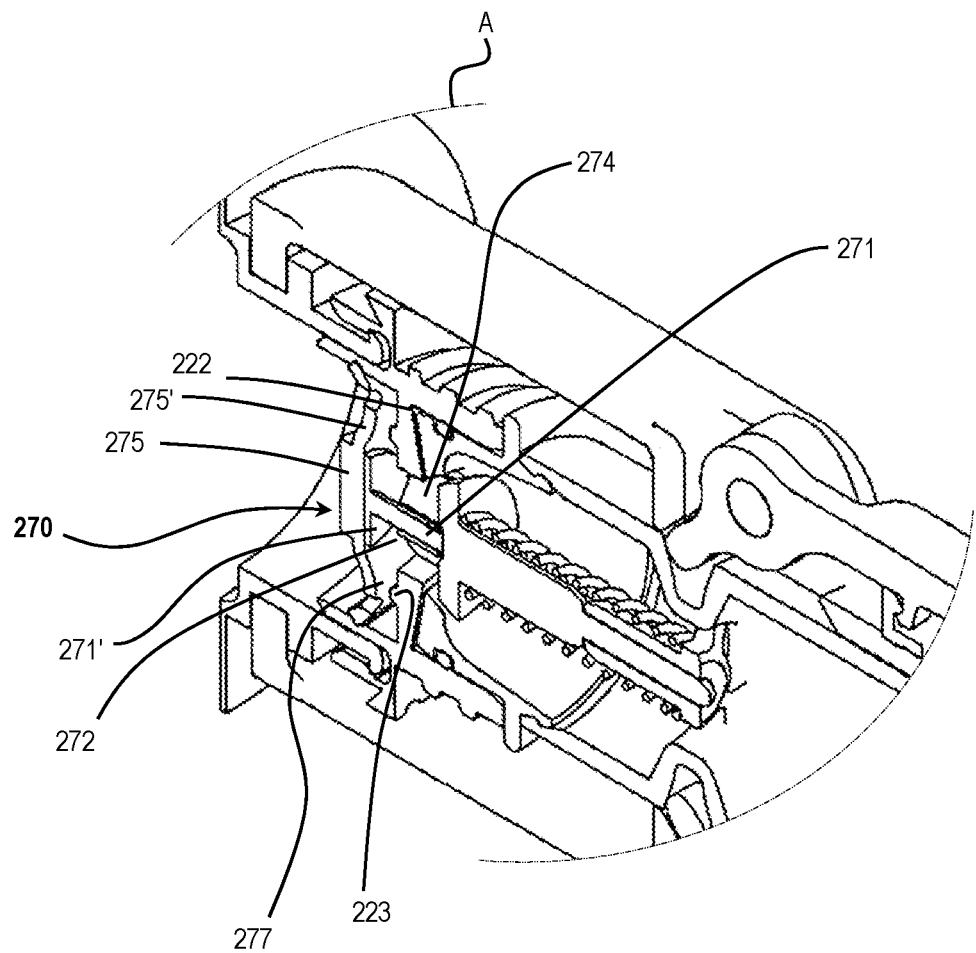
FIG. 11 provides an exploded view of portion A of the connector assembly of FIG. 7, showing further details of a valve assembly in accordance with at least one embodiment of the disclosure.

With further reference to FIG. 11, valve 270 is engaged with a collection of support fingers 274 or similar structure such as flanges. The support fingers 274 may also be connected to, supported by or integrally formed with sleeve inner flange 222. The support fingers 274 may be engaged with or connected to and supported about a valve guide sleeve or bore 272. The bore 272 serves to slidably receive valve stem 271. As described above, valve stem 271 engages with poppet assembly 170 and specifically head face 177 of poppet assembly 170. Such engagement, in conjunction with the cam 160 being engaged, serves to drive the valve stem 271 to the left as shown in FIG. 11. As a result, the valve 270 is opened together with the poppet assembly or poppet 170 being opened. Accordingly, with such arrangement of valve 270 and poppet 170, fluid flow upstream and downstream can be contained or stopped, when the connector 100 and spout assembly 200 are disconnected.

To explain further, the valve 270 includes, in one embodiment, a connector pad 271'. The connector pad 271' may be connected or integrally formed at a distal end of the valve stem 271. The connector pad 271' provides a connector pad or area to connect valve head 275 to the connector pad 271' and to valve stem 271. The valve head 275 includes a sealing face 277. The sealing face 277 is constructed and provided to engage with valve sealing ridge 223. Accordingly, the engagement of sealing face 277 with valve sealing ridge 223 affects closure of the valve 270.

Provided on the outside or outboard of the valve sealing ridge 223, the valve head 275 may be provided with head side flanges 275'. The head side flanges 275' may be provided in the form of fingers, perforated flanges or similar structure that allow fluid to pass through the head side flanges 275'. Further, the valve 270 may be provided with a bias-orientation element 276. The bias-orientation element 276 may provide a mechanism to bias the valve 270 to a closed position.

Figure 12:
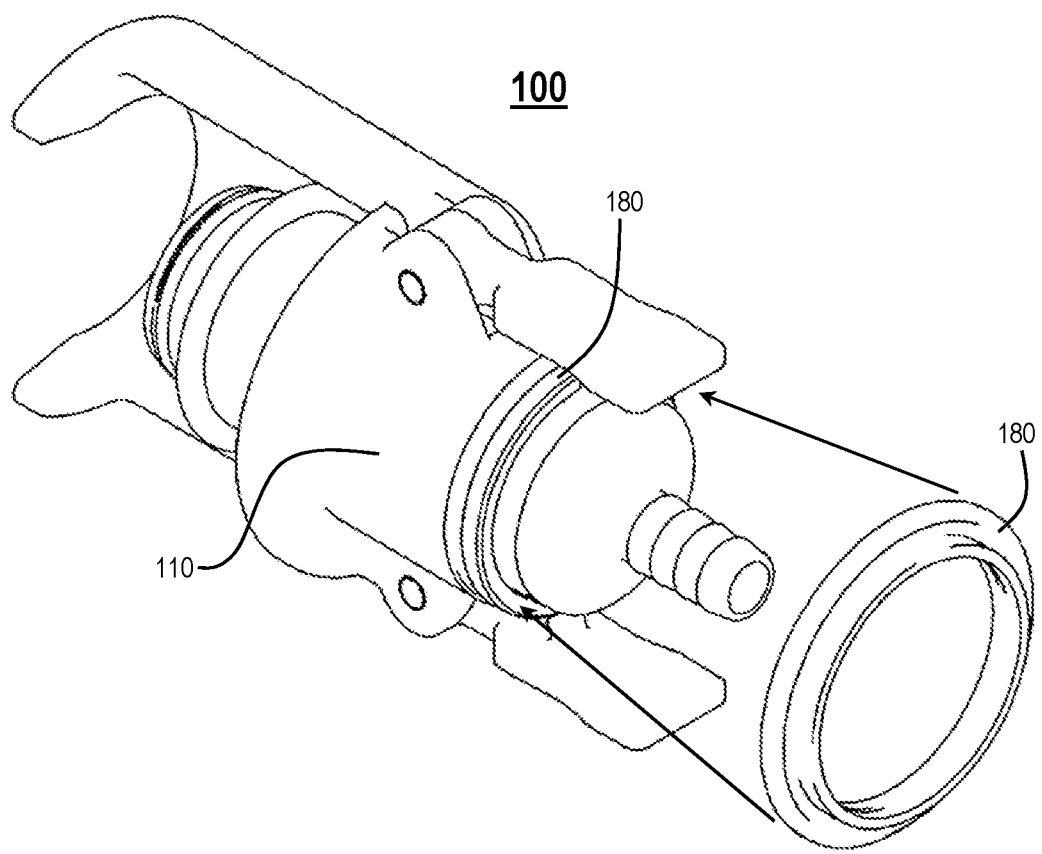
FIG. 12 provides a perspective view of a connector showing further details of a catch ring, in accordance with at least one embodiment of the disclosure.

FIG. 12 is a perspective view of a connector 100 showing further details of catch ring 180, in accordance with at least one embodiment of the disclosure. The catch ring may be attached to the outer housing 110 using a snap feature, in accordance with at least one embodiment of the invention. That is, the outer housing 110 may engage and retain the catch ring 180 by the catch ring 180 snapping into place upon the outer housing 110. However, it is appreciated that other attachment mechanisms may be utilised including threaded arrangement, interference fit, other snap fit arrangements, barb, adhesive, welding, or integral construction, for example.

Figure 14:
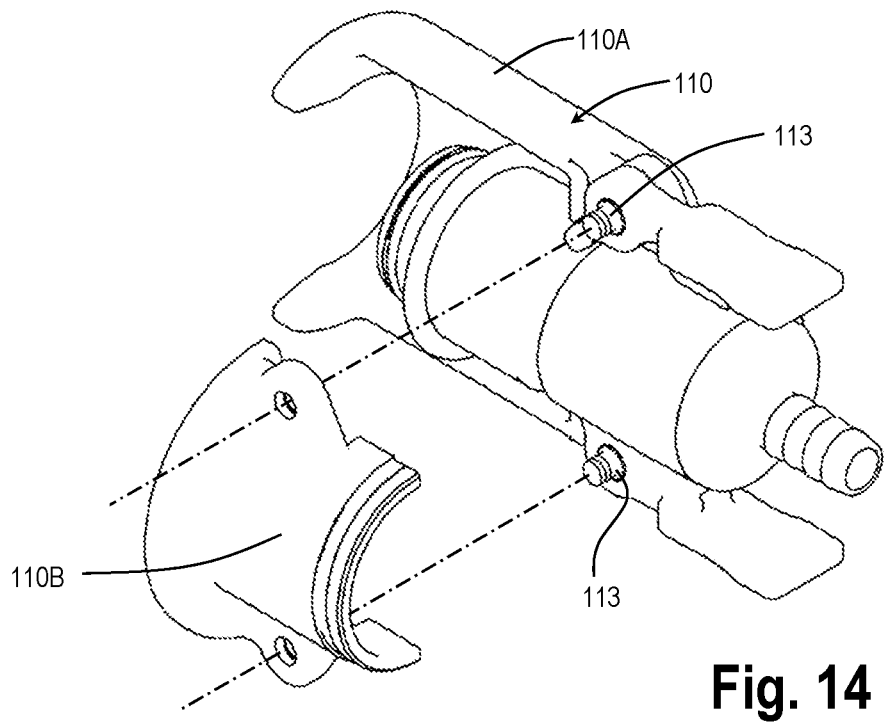
FIG. 14 provides a further exploded view of an outer housing and cam in a second assembly position, in accordance with at least one embodiment of the disclosure.

FIG. 13 provides an exploded view of outer housing 110 and cam 160 showing further detail of components in a first assembly position. FIG. 14 provides a further exploded view of outer housing 110 and cam 160 showing further details of components in a second assembly position.

As described above, the outer housing 110 may be provided with pivot pins 113. Each pivot pin 113 may be provided with opposing threaded or snap fit ends 113E, for example, that are received in mating apertures or bores 116 in the outer housing 110. However, it should be appreciated that other connection mechanisms might be utilised, such as interference fit, other snap fit arrangements, barb, adhesive, or welding, for example. Accordingly, the respective ends of each pivot pin 113 of this particular embodiment may be fixedly provided and connected to receiving bores 116 in the outer housing 110. A central portion 113C may also be provided with a smooth surface so as to allow free rotation of lever arm 161 thereabout. However, it will be appreciated by those skilled in the art that various pin arrangements or pivot arrangements may be utilised to pivotally support each lever arm 161 upon outer housing 110, so as to provide desired rotation.

FIG. 14 shows the outer housing 110 which may be constructed of opposing housings including outer housing portion 110A and outer housing portion 110B. During assembly of the connector 100, each pivot pin 113 may be positioned as shown in FIG. 14, along with lever arms 161. The outer housing portion 110B may then be slid over the two pivot pins 113 to secure the assembly. The outer housing portion 110A and outer housing portion 110B may be secured together using adhesive or any other suitable connection technique, including those otherwise described herein.

Figure 15:
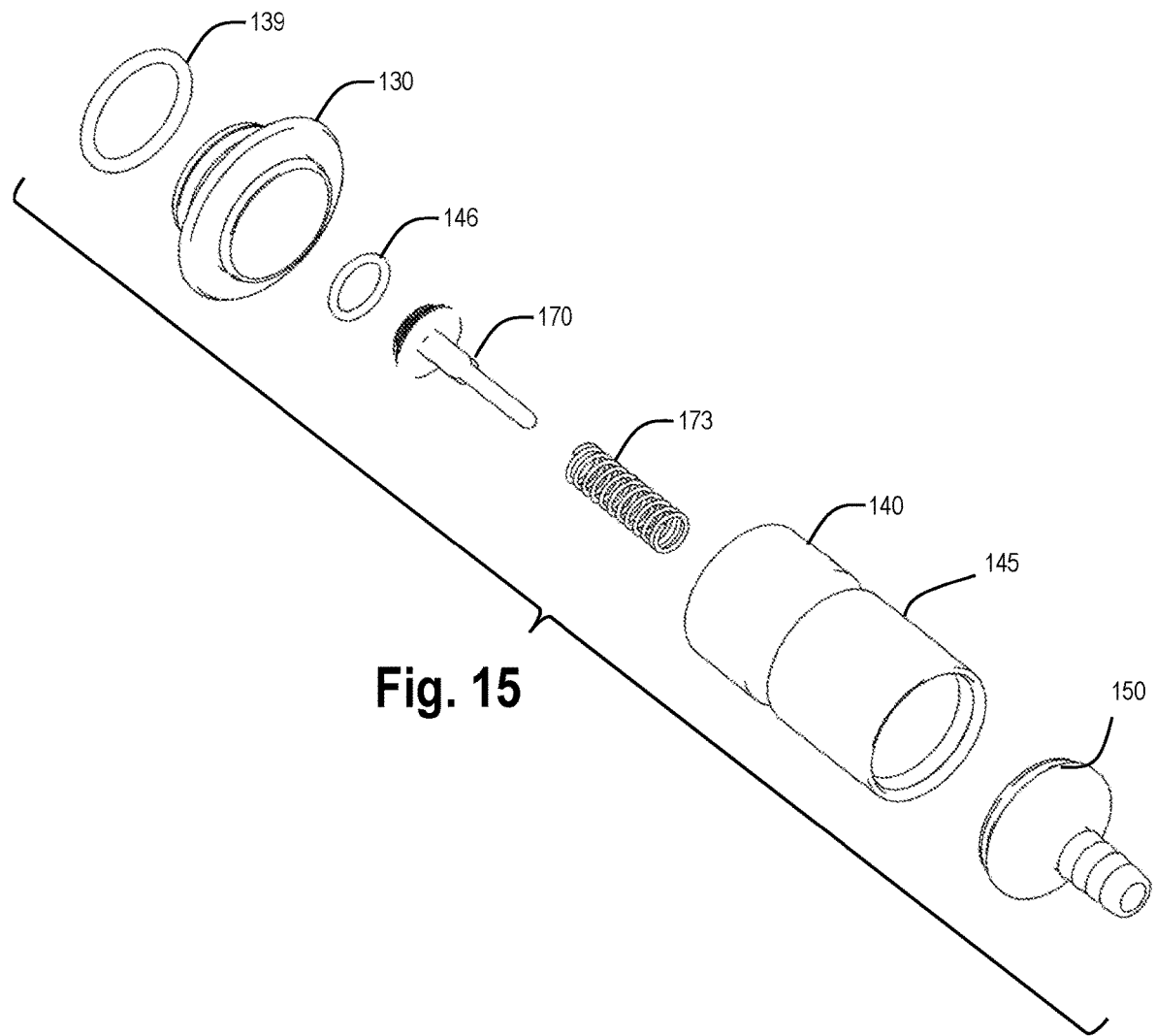
FIG. 15 provides an exploded perspective view of an inner housing in accordance with at least one embodiment of the disclosure.

FIG. 15 provides an exploded perspective view showing further details of inner housing 120. In particular, FIG. 15 shows aspects of assembly of a connector 100. As otherwise described herein, attachment inner housing 150 may be snap fit or otherwise attached onto sleeve inner housing 140. Poppet element 170, as shown in FIG. 15, may be slid onto spring 173. The poppet element 170, with spring 173, may then be inserted into sleeve inner housing 140, to be supported in the manner shown in FIG. 7. An optional O-ring 146 may be placed between poppet element 170 and tip inner housing 130 to provide additional water tightness. The tip inner housing 130 may then be snap fitted or otherwise attached onto the sleeve inner housing 140. Lastly, O-ring 148 may be disposed upon or into O-ring channel 148'. As shown, the assembly of FIG. 15 may provide fluid flow therethrough. FIG. 15 also shows cam surface 145. As shown, cam surface 145 may be shaped as an annular channel extending around the periphery of sleeve inner housing 140.

Figure 16:
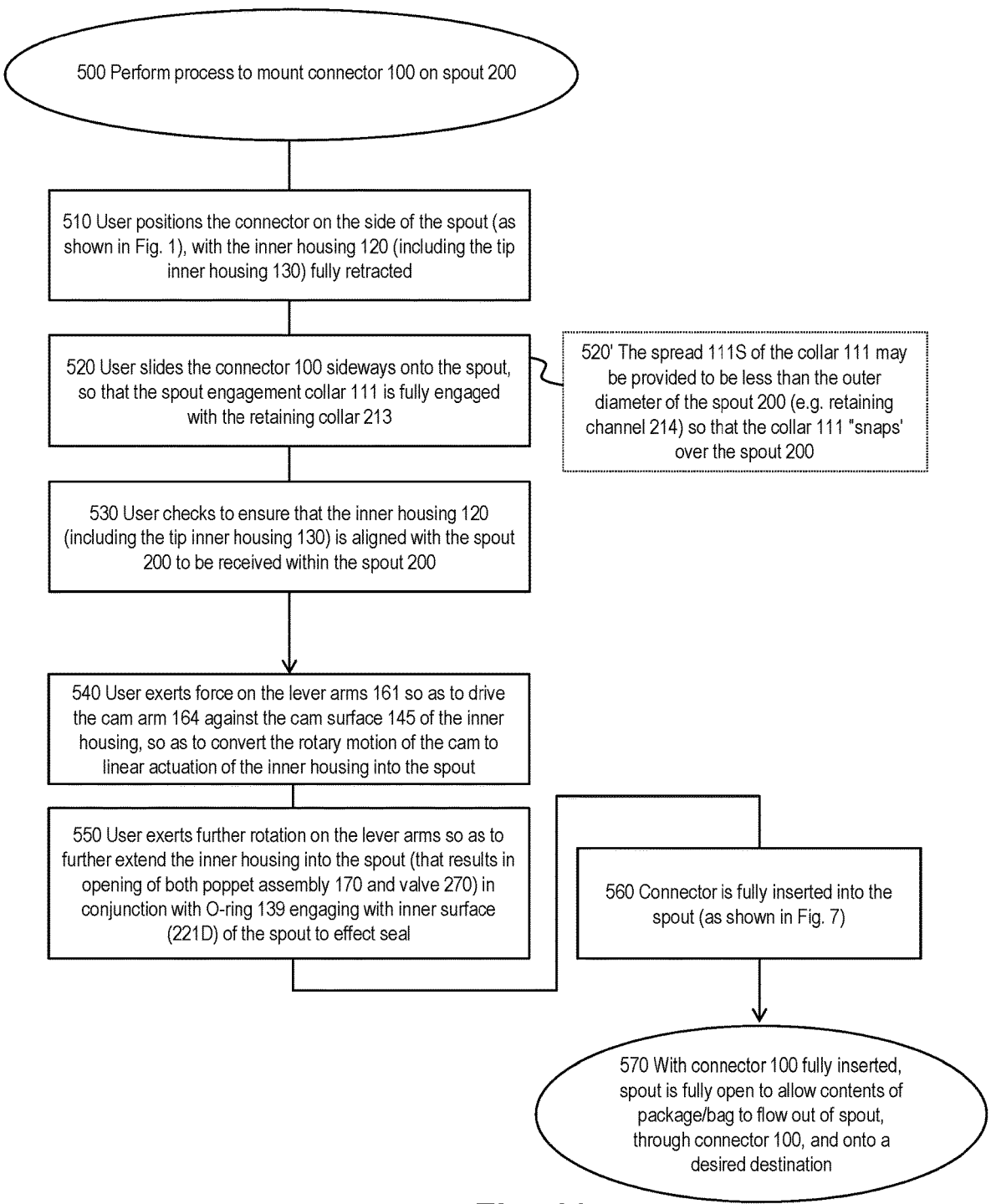
FIG. 16 provides a flowchart showing the steps of an assembly process, in accordance with at least one embodiment of the disclosure.

FIG. 16 provides a flowchart showing an assembly process 500 applicable to the assembly of any number of embodiments. A first step involves mounting connector 100 on spout assembly 200 and positioning connector 100 next to spout assembly 200. More specifically, as indicated at step 510 of FIG. 16, a user positions the connector on the side of the spout assembly, with the inner housing 120 (including the tip inner housing 130) fully retracted. Then, as indicated at step 520, the user slides the connector 100 sideways onto the spout assembly, so that the spout assembly engagement collar 111 is fully engaged with the retaining collar 213. As indicated at 520', in accordance with at least one embodiment of the disclosure, the spread 1115 (see FIG. 1) of the collar 111 may be provided to be less than the exterior periphery of the spout assembly 200 (e.g. retaining channel 214) so that the collar 111 snaps over the spout assembly 200, which may retain the collar 111 on the spout assembly 200.

As further shown in FIG. 16, and as indicated at step 530, the user checks to ensure that the inner housing 120 (including the tip inner housing 130) is aligned with the spout assembly 200 to be received within the spout assembly 200. Then, as indicated at step 540, the user may exert force on the lever arms 161 to drive the cam arms 164 against the cam surface 145 of the inner housing, so as to convert the rotary motion of the cam to linear actuation of the inner housing into the spout assembly. The direction of such force is shown by arrows 4' in FIG. 4.

Then, as indicated at step 550, the user exerts further rotation on the lever arms so as to further extend the inner housing into the spout assembly (resulting in opening of both poppet assembly 170 and valve 270) in conjunction with O-ring 139 engaging with inner surface (221D) of the spout assembly to form a seal. The opening of both poppet assembly 170 and valve 270 in conjunction with each other provides for the advantage that fluid in the attachment inner housing 150 or other fluid "downstream" of the poppet assembly 170 is prevented from flowing upstream into the spout assembly prior to attachment of the connector 100.

As shown in FIG. 16 and indicated at step 560, the connector is fully inserted into the spout assembly (as shown in FIG. 7). Then, as indicated at step 570, with connector 100 fully inserted, the position of the spout assembly is fully opened to allow the contents of the connected package or bag, for example, to flow out of spout assembly, through connector 100 to a desired destination.

As described above, FIG. 17 provides a perspective view of a connector assembly 10' that shows an alternative attachment feature. The connector assembly 10' includes various structures similar to those described above. 155' provides a mechanism to open the one-way valve inside the connector of a post-mix system. However, in particular, the connector assembly 10' includes a variance as illustrated by the attachment of inner housing 150'. In contrast to the hose barb 151 of FIG. 1, for example, the attachment of inner housing 150' is threaded 151' around an outer periphery thereof. Such threading is designed to cooperate with the connector of the post-mix system. The inner housing 150' may include knurls 156' or similar structures to aid the attachment of the connector of the post-mix system to the inner housing 150'. The cap 155' may also include a valve, such as one-way valve 155'. The inner housing 150' may feature a projection 155' that is designed to engage with and open the one-way valve within the connector of the post-mix system.

Various other structures may be disposed upon or used in combination with the connector assembly 10' and other connector assemblies described herein.

As described above, FIG. 18 provides a perspective view of a spout assembly 200 disposed upon a package 700. FIG. 19 provides a perspective view of the connector assembly 10 of FIG. 18. The connector assembly 10 includes a connector 100 positioned on the spout assembly 200. The connector 100 may be engaged with the spout assembly 200 in the manner described above. Additionally, FIG. 19 shows a connection to tube 800 connected to and in fluid communication with the connector assembly 10. The connection to 800 is secured using hose clip 801. In lieu of connection to tube 800, is appreciated that a wide variety of devices may be utilised in connection with connector assembly 10.

It is appreciated the specific connection or attachment mechanisms or methodologies used to connect two particular components of the connector assembly, as described herein, may be utilised to connect other components of the connector assembly, as may be desired.

The various components described herein may be made from any of a variety of materials including, for example, plastic, plastic resin such as polyethylene, polypropylene, nylon, composite material, or rubber, for example, or any other material as may be desired. For example, the connector or the spout assembly of this disclosure may be produced from a plastic resin, such as polyethylene, and by injection moulding. However, it is appreciated that safe material consideration should be considered in the case that the assembly of this disclosure is to be used with a consumable. The apparatus of the disclosure, as described herein, is used in the context of a bag or container that contains a liquid. However, the apparatus of the disclosure may be used in conjunction with other substances, such as gases or vapor, for example.

A variety of production techniques may be used to make the apparatuses and components described herein. For example, suitable injection molding and other molding techniques and other manufacturing techniques might be utilised. Also, the various components of the apparatuses may be integrally formed, as may be desired, in particular when using moulding construction techniques. Also, the various components of the apparatuses may be formed in pieces and connected in some manner, such as with suitable adhesive.

Fastener arrangements, such as those needed to connect the spout assembly securement collar to a supporting bag, used in the invention might include welding, compression fit, D-zip, tape and/or adhesive, for example. Suitable faster arrangements acceptable for the intended use (for example to comply with regulations such as food standards or that are fit for the intended purpose) will be well known to persons skilled in the art. Thus, such persons may select between alternative fastener arrangements, as required.

The various apparatuses and components of the apparatuses, as described herein, may be provided in various sizes and/or dimensions, as desired. Suitable sizes and/or dimensions will vary depending on the specifications of connecting components or the field of use, which may be selected by persons skilled in the art.

It will be appreciated that features, elements and/or characteristics described with respect to one embodiment of the disclosure may be used with other embodiments of the invention, as desired. It will also be appreciated that the effects of the present disclosure are not limited to the above-mentioned effects, and other effects, which are not mentioned herein, will be apparent to those skilled in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the figures. It will be understood that spatially relative terms are intended to encompass different orientations of structures in use or operation, in addition to the orientation depicted in the drawing figures. For example, if a device in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the description are described herein with reference to diagrams and/or cross-section illustrations, for example, that are schematic illustrations of preferred embodiments (and intermediate structures) of the description. As such, variations from the shapes of the illustrations as a result, for example, of manufacturing techniques and/or tolerances, are to be expected. Thus, embodiments of the description should not be construed as limited to the particular shapes of components illustrated herein but are to include deviations in shapes that result, for example, from manufacturing.

Unless otherwise defined, all terms (including technical and scientific terms) used herein have the same meaning as commonly understood by one of ordinary skill in the art to which this description belongs. It will be further understood that terms, such as those defined in commonly used dictionaries, should be interpreted as having a meaning that is consistent with their meaning in the context of the relevant art and will not be interpreted in an idealised or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the description. The appearances of such phrases in various places in the specification are not necessarily all referring to the same embodiment. Further, when a particular feature, structure, or characteristic is described in connection with any embodiment, it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed above.

While the invention has been described above in terms of specific embodiments, it is to be understood that the invention is not limited to these disclosed embodiments. Upon reading the teachings of this disclosure many modifications and other embodiments of the invention will come to the mind of those skilled in the art to which this invention pertains, and which are intended to be and are covered by both this disclosure and the appended claims.

All publications mentioned in this specification are herein incorporated by reference. Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia or elsewhere before the priority date of each claim of this application.

It is indeed intended that the scope of the invention should be determined by proper interpretation and construction of the appended claims and their legal equivalents, as understood by those skilled in the art relying upon the disclosure in this specification and the attached drawings.

The invention claimed is:

1. A connector assembly for connecting with a spout provided on a flexible fluid container, wherein the connector assembly comprises,
    an elongated outer housing for maintaining an inner housing substantially therein formed from an outer housing wall having an inner surface and terminating at a first lengthwise end with an outlet shoulder for maintaining an outlet portion partially within the elongated outer housing, and terminating at a second lengthwise end with a spout engagement collar for aligning the connector assembly above the spout,
    the inner housing further comprising an elongated sleeve member having an outer surface and defining an internal channel for allowing the passage of fluid therethrough, the outer surface of the elongated sleeve member facing at least a portion of the inner surface of the elongated outer housing and configured to have minimal clearance between the outer surface and the inner surface, the elongated sleeve member extending at one end with an outlet for directing the flow of fluid therethrough and at the other end with a spout connector configured to form a sealed connection with the spout on the flexible fluid container, and
    a slider assembly for moving the outer surface of the elongated sleeve member over the inner surface of the outer housing wall of the outer housing in a lengthwise motion to position the spout connector upon the spout and secure the spout connector in said position,
    wherein the slider assembly is actuated about a fulcrum.

2. The connector assembly according to claim 1 wherein the elongated outer housing comprises one or more apertures formed through the outer housing wall and the slider assembly comprises at least one shaft positioned to occupy a space defined by the one or more apertures, wherein the at least one shaft provides a hinge about which the movement of the elongated sleeve member within the elongated outer housing is actuated.

3. The connector assembly according to claim 2 wherein the slider assembly comprises one or more levers configured to hinge about the fulcrum and actuate the movement of the elongated sleeve member within the elongated outer housing.

4. A method of manufacture of a connector assembly according to claim 3 wherein the elongated outer housing, elongated sleeve member, outlet portion, spout connector and the one or more levers are moulded from a plastic or plastic composite material and are thereafter assembled together with other components.

5. The connector assembly according to claim 3 wherein the one or more levers comprise at least one lever aperture formed therethrough and the at least one shaft is configured to occupy a space defined by the at least one lever aperture.

6. The connector assembly according to claim 5 wherein the slider assembly comprises at least a pair of levers each having a sleeve engagement flange, configured to hinge about at least a pair of shafts wherein the sleeve engagement flanges compress the elongated sleeve member against the resistant pressure of the biasing means to permit the flow of fluid through the internal channel defined by the elongated sleeve member.

7. The connector assembly according to claim 6 comprising a fastener coupling to maintain the elongated sleeve member in an engaged position when compressed against the biasing means.

8. The connector assembly according to claim 7 wherein the fastener coupling comprises at least one curved protrusion projecting outwardly from at least one of the one or more levers and at least one catch on the elongated outer housing for receiving the at least one curved protrusion wherein the elongated sleeve member may be moved from a retracted position to an engaged position by actuating the one or more levers about the fulcrum to compress the biasing means until the at least one curved protrusion is received by the at least one catch on the elongated outer housing to secure the fastener coupling.

9. The connector assembly according to claim 8 wherein the at least one catch on the elongated outer housing comprises an annular catch ring positioned about the elongated outer housing wherein the at least one curved protrusion is fastened to the annular catch ring when the elongated sleeve member is moved to an engaged position.

10. A method of connecting a connector assembly according to claim 9 comprising the steps of,
    placing the spout engagement collar of the connector assembly around the spout to align the connector assembly with the spout, and moving the at least a pair of levers about the fulcrum to compress the biasing means until the at least one curved protrusion is received by the at least one catch on the elongated outer housing to secure the fastener coupling, wherein the motion of the at least a pair of levers moves the elongated sleeve member of the connector assembly from a retracted position to an engaged position to permit the flow of fluid through the internal channel defined by the elongated sleeve member.

11. A method of connecting a connector assembly according to claim 1 comprising the steps of, placing the spout engagement collar of the connector assembly around the spout to align the connector assembly with the spout, moving the elongated sleeve member of the connector assembly from a retracted position to an engaged position to permit the flow of fluid through the internal channel defined by the elongated sleeve member.

12. The connector assembly according to claim 1, wherein the spout engagement collar is configured to grip the spout provided on the flexible fluid container by fitting within a space formed between two or more spout threads, annular ridges or other protrusions on the spout.

13. The connector assembly according to claim 1, comprising a biasing means adapted to prevent the flow of fluid through the internal channel defined by the elongated sleeve member when the connector assembly is placed in a retracted position and adapted to permit the flow of fluid through the internal channel defined by the elongated sleeve member when the connector assembly is placed in an engaged position.

14. The connector assembly according to claim 13, wherein the biasing means comprises a spring actuated valve assembly.

* * * * *

UNITED STATES PATENT AND TRADEMARK OFFICE
CERTIFICATE OF CORRECTION

PATENT NO. : 11,673,786 B2
APPLICATION NO. : 17/055707
DATED : June 13, 2023
INVENTOR(S) : Simon Edwards It is certified that error appears in the above-identified patent and that said Letters Patent is hereby corrected as shown below:

On the Title Page

At item (71), change the Applicant from Ourip Pty Ltd, Glenelg (AU) to Fore Holdings Pty Ltd., Adelaid (AU)

At item (73), change the Assignee from Ourip Pty Ltd, Glenelg (AU) to Fore Holdings Pty Ltd., Adelaid (AU)

Signed and Sealed this
Eighteenth Day of July, 2023

Katherine Kelly Vidal
*Director of the United States Patent and Trademark Office*